US012632835B2

(12) United States Patent
Hansen

(10) Patent No.: US 12,632,835 B2
(45) Date of Patent: May 19, 2026

(54) HARD DRIVE DESTRUCTION DEVICE AND METHOD

(71) Applicant: Chris Hansen, Berryville, VA (US)

(72) Inventor: Chris Hansen, Berryville, VA (US)

( * ) Notice: Subject to any disclaimer, the term of this patent is extended or adjusted under 35 U.S.C. 154(b) by 0 days.

(21) Appl. No.: 18/886,353

(22) Filed: Sep. 16, 2024

(65) Prior Publication Data

US 2025/0094940 A1    Mar. 20, 2025

Related U.S. Application Data

(60) Provisional application No. 63/538,686, filed on Sep. 15, 2023.

(51) Int. Cl.
| | |
|---|---|
| *G06Q 10/30* | (2023.01) |
| *B02C 23/00* | (2006.01) |
| *B02C 25/00* | (2006.01) |
| *G06Q 20/18* | (2012.01) |
| *G06V 10/764* | (2022.01) |

(52) U.S. Cl.
CPC ............. *G06Q 10/30* (2013.01); *B02C 23/00* (2013.01); *B02C 25/00* (2013.01); *G06Q 20/18* (2013.01); *G06V 10/764* (2022.01)

(58) Field of Classification Search
CPC ............ G06Q 10/30; B09B 3/35; B02C 25/00
See application file for complete search history.

(56) References Cited

U.S. PATENT DOCUMENTS

| | | | |
|---|---|---|---|
| 6,763,997 | B2 | 7/2004 | Bennett et al. |
| 7,213,777 | B2 | 5/2007 | Podrovitz |
| 7,667,923 | B1 | 2/2010 | Chontos et al. |
| 7,975,950 | B2 | 7/2011 | Ebadian et al. |
| 8,251,303 | B2 | 8/2012 | Wozny |
| 8,763,940 | B2 | 7/2014 | Stofan et al. |
| 8,794,559 | B1 | 8/2014 | Olliges et al. |
| 8,887,605 | B2 | 11/2014 | Van Gemert |
| 9,430,654 | B1 | 8/2016 | Rajaie |

(Continued)

FOREIGN PATENT DOCUMENTS

| | | | | |
|---|---|---|---|---|
| CN | 115273339 | | 11/2022 | |
| FR | 3010331 A1 | * | 3/2015 | ............. B02C 19/00 |

(Continued)

OTHER PUBLICATIONS

VeritySystems.com, WebArchive ScreenGrab of Feb. 6, 2023 and accompanying DataSheet, Available at: https://web.archive.org/web/20230206215020/https://www.veritysystems.com/products/crunch-250-hard-drive-destroyer/, last accessed Nov. 7, 2025 (Year: 2023).*

(Continued)

*Primary Examiner* — Emmett K. Walsh
(74) *Attorney, Agent, or Firm* — Benjamin C. Rothermel, Esq.

(57) ABSTRACT

A hard drive destruction device includes a kiosk having: a user interface, a hard drive portal, a camera, and a crushing unit; and a software for managing the hard drive destruction device. The software includes: an artificial intelligence and/or machine learning software component that detects and analyzes a hard drive inserted into the hard drive portal using the camera; and a back-end software component comprising a memory that stores a captured image of the hard drive, a verification information, and a chain-of-custody documentation.

9 Claims, 29 Drawing Sheets

(56)                References Cited

U.S. PATENT DOCUMENTS

| | | | |
|---|---|---|---|
| 9,633,494 B1 | 4/2017 | Sun et al. | |
| 10,556,240 B2 | 2/2020 | Clark | |
| 10,657,345 B1* | 5/2020 | Ebadian | B02C 25/00 |
| 10,675,635 B1 | 6/2020 | Drexler et al. | |
| 10,860,009 B1 | 12/2020 | Harper | |
| 11,014,093 B1 | 5/2021 | Drexler et al. | |
| 11,107,495 B2 | 8/2021 | Clark | |
| 11,167,384 B2 | 11/2021 | Clark | |
| 11,230,752 B2 | 1/2022 | Mcintyre et al. | |
| 11,243,710 B1 | 2/2022 | Picone | |
| 11,429,088 B2 | 8/2022 | Harper | |
| 11,590,508 B2 | 2/2023 | Kashihara et al. | |
| 11,682,422 B1 | 6/2023 | Rajaie | |
| 11,835,940 B2 | 12/2023 | Harper | |
| 2006/0219829 A1* | 10/2006 | Smith, III | B02C 1/14 241/168 |
| 2007/0063082 A1 | 3/2007 | Coleman | |
| 2007/0147776 A1* | 6/2007 | Ito | B09B 5/00 386/254 |
| 2008/0250948 A1* | 10/2008 | Aoki | B26F 1/24 100/282 |
| 2010/0102126 A1 | 4/2010 | Benson | |
| 2010/0276524 A1* | 11/2010 | Ebadian | B30B 15/16 241/34 |
| 2010/0294865 A1* | 11/2010 | Wozny | G11B 23/505 241/36 |
| 2014/0001295 A1* | 1/2014 | Stofan | B02C 1/14 241/262 |
| 2014/0208965 A1 | 7/2014 | Noblitt et al. | |
| 2016/0303575 A1 | 10/2016 | Smith | |
| 2018/0341929 A1 | 11/2018 | Curtis et al. | |
| 2019/0099971 A1* | 4/2019 | Gutierrez | B02C 19/0056 |
| 2020/0363790 A1* | 11/2020 | Harper | G05B 19/41865 |
| 2021/0094038 A1* | 4/2021 | Kashihara | B02C 25/00 |
| 2021/0138481 A1 | 5/2021 | Zevenbergen | |
| 2023/0111358 A1 | 4/2023 | Delahunty et al. | |
| 2023/0376707 A1 | 11/2023 | Rajaie | |
| 2024/0103501 A1 | 3/2024 | Harper | |

FOREIGN PATENT DOCUMENTS

| | | |
|---|---|---|
| JP | 2022129397 | 9/2022 |
| KR | 10-2212516 | 2/2021 |
| WO | 201020430 | 2/2010 |

OTHER PUBLICATIONS

International Search Report and Written Opinion of the International Searching Authority dated Jan. 31, 2025, in International Application No. PCT/US2024/046968.

* cited by examiner

FIG. 10

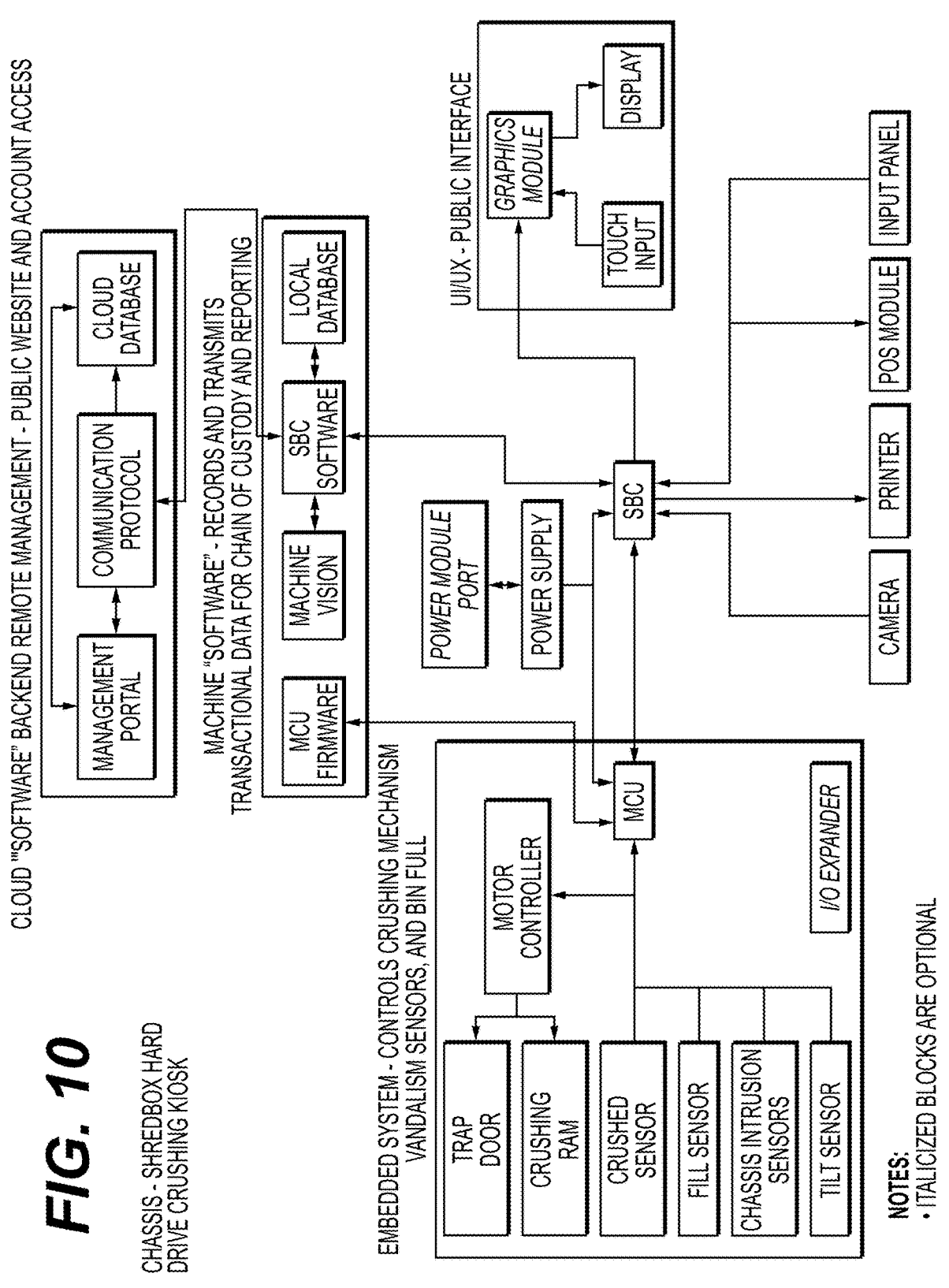

CHASSIS - SHREDBOX HARD DRIVE CRUSHING KIOSK

CLOUD "SOFTWARE" BACKEND REMOTE MANAGEMENT - PUBLIC WEBSITE AND ACCOUNT ACCESS

MANAGEMENT PORTAL

COMMUNICATION PROTOCOL

CLOUD DATABASE

MACHINE "SOFTWARE" - RECORDS AND TRANSMITS TRANSACTIONAL DATA FOR CHAIN OF CUSTODY AND REPORTING

MCU FIRMWARE

MACHINE VISION

SBC SOFTWARE

LOCAL DATABASE

UI/UX - PUBLIC INTERFACE

GRAPHICS MODULE

DISPLAY

TOUCH INPUT

POWER MODULE PORT

POWER SUPPLY

SBC

CAMERA

PRINTER

POS MODULE

INPUT PANEL

EMBEDDED SYSTEM - CONTROLS CRUSHING MECHANISM VANDALISM SENSORS, AND BIN FULL

MOTOR CONTROLLER

MCU

I/O EXPANDER

TRAP DOOR

CRUSHING RAM

CRUSHED SENSOR

FILL SENSOR

CHASSIS INTRUSION SENSORS

TILT SENSOR

NOTES:
• ITALICIZED BLOCKS ARE OPTIONAL

101

112

110

110a

111

101

210a

201

HARD DRIVE DESTRUCTION DEVICE AND METHOD

CROSS-REFERENCE TO RELATED APPLICATION

This application claims priority from and the benefit of U.S. Provisional Patent Application No. 63/538,686, filed on Sep. 15, 2023, which is hereby incorporated by reference for all purposes as if fully set forth herein.

BACKGROUND

Hard drive shredding is conventionally inconvenient and expensive. A standard hard drive shredder can cost more than $50,000. This makes it economically unfeasible for a small- or medium-sized business or individual to have an in-house hard drive shredding machine. On the service provider side, it is challenging and expensive serving smaller entities, such as with less than 100 drives to be shredded, using centralized shredding locations or sending vehicles mounted with shredding machines to individual sites.

There is also a problem with lack of transparency around handling and recycling hard drives. Sending waste hard drives to recycling or shredding sites poses a risk of such hard drives being resold to third parties, leading to a threat of data breaches.

The above information disclosed in this Background section is only for enhancement of understanding of the background of the inventive concept, and, therefore, it may contain information that does not form the prior art that is already known in this country to a person of ordinary skill in the art.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 10 is a schematic diagram of software for managing a hard drive destruction device according to an exemplary embodiment.

DETAILED DESCRIPTION OF THE ILLUSTRATED EMBODIMENTS

Figure 1:
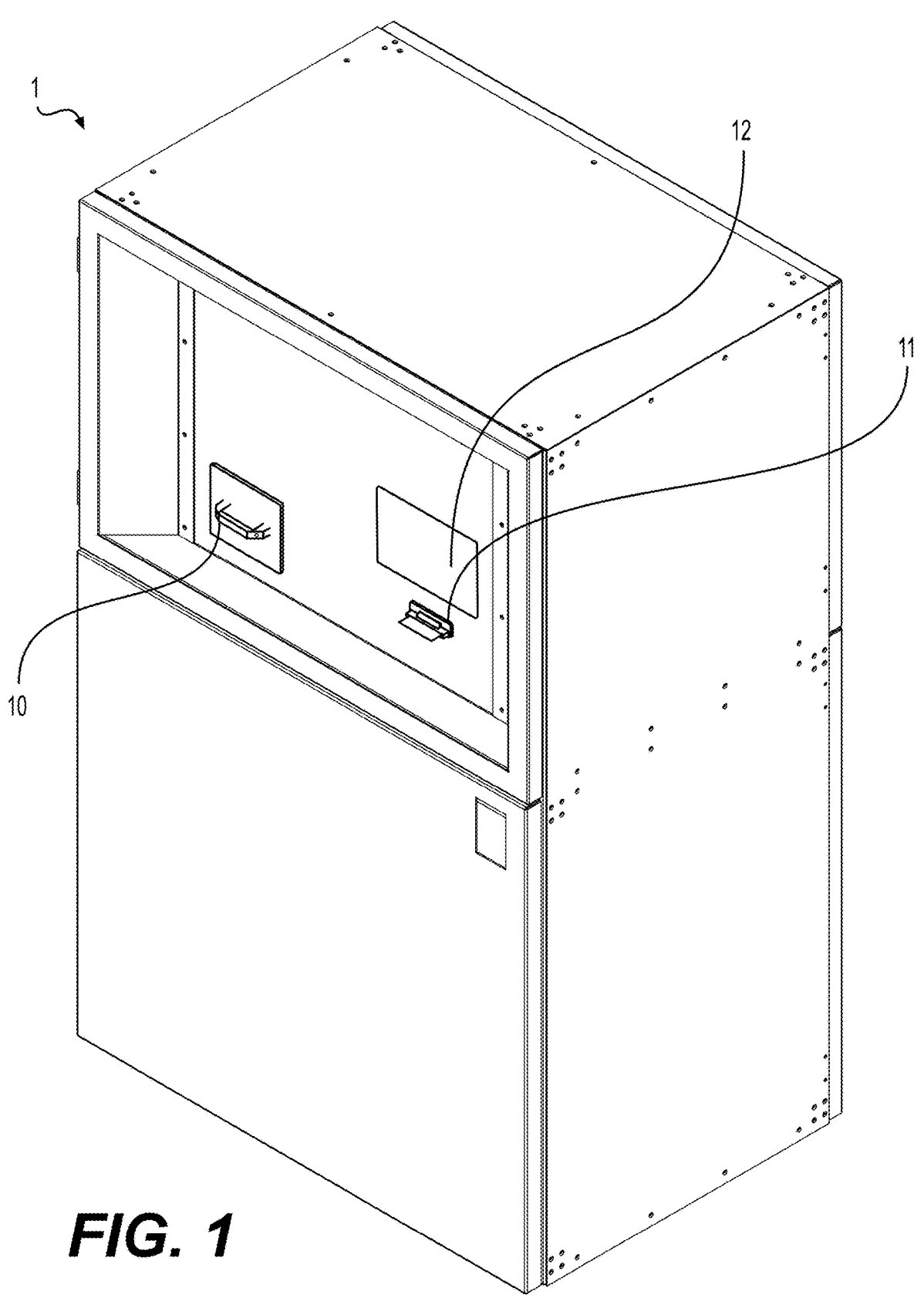
FIG. 1 is a perspective view of a hard drive destruction device according to an exemplary embodiment.
Figure 2:
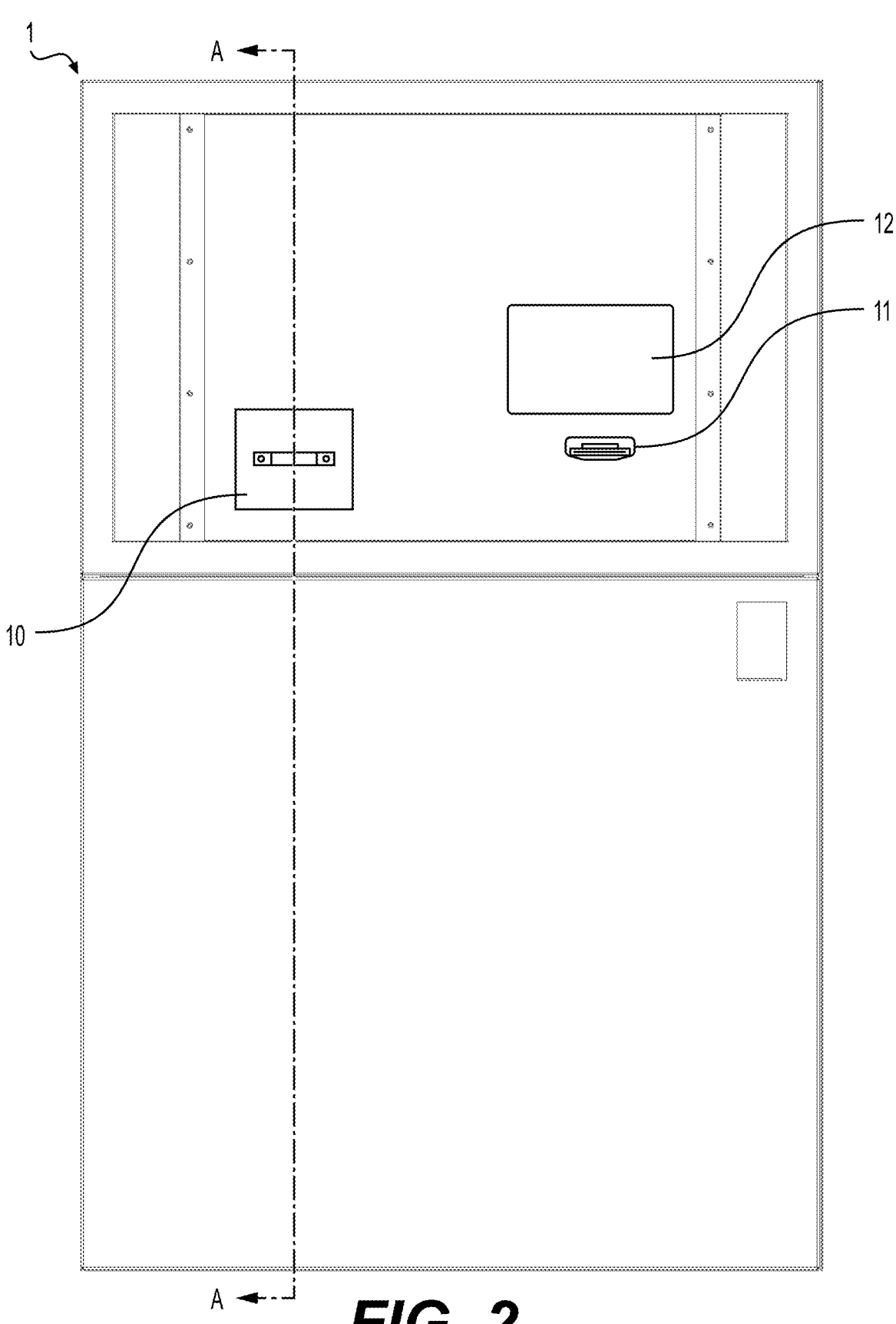
FIG. 2 is a front view of the hard drive destruction device of FIG. 1.
Figure 3:
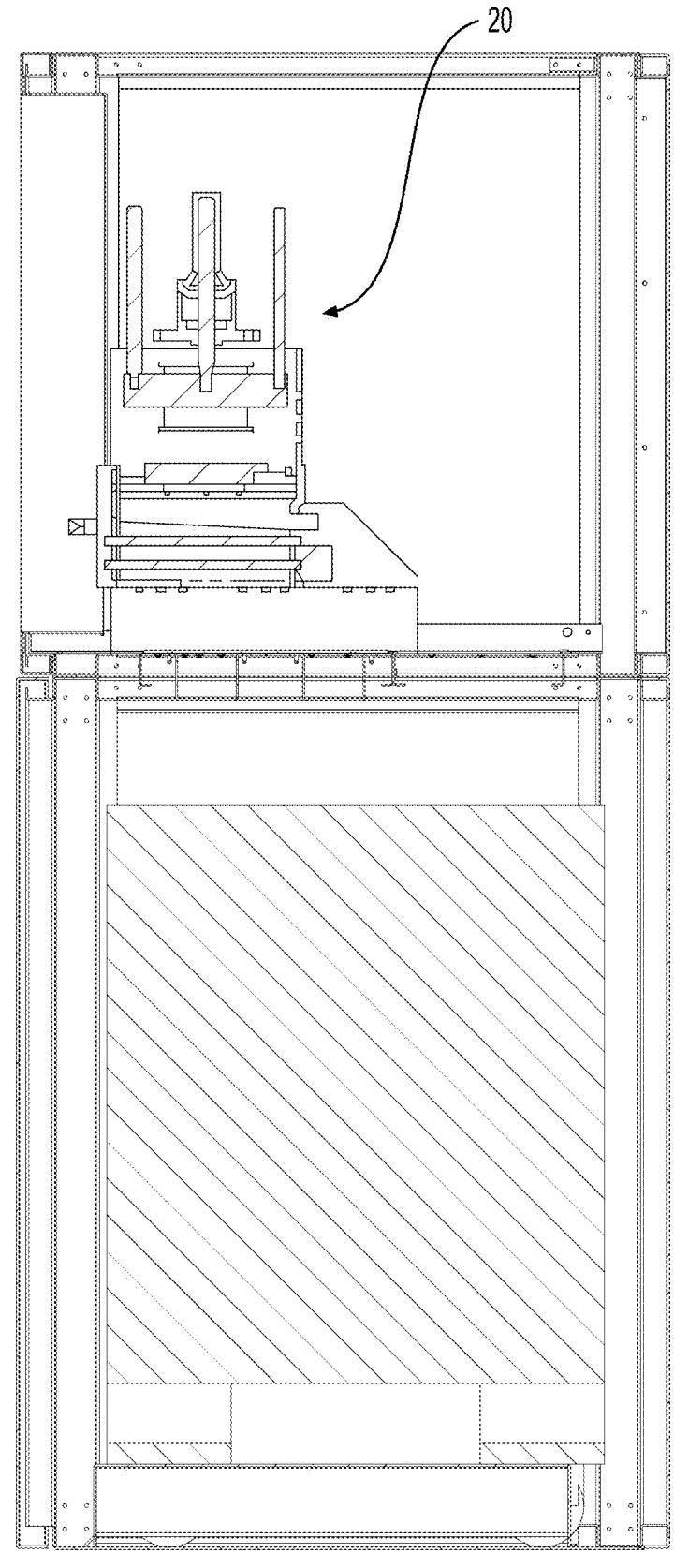
FIG. 3 is a cross-sectional view of the hard drive destruction device of FIG. 1, taken along line A-A of FIG. 2.
Figure 4:
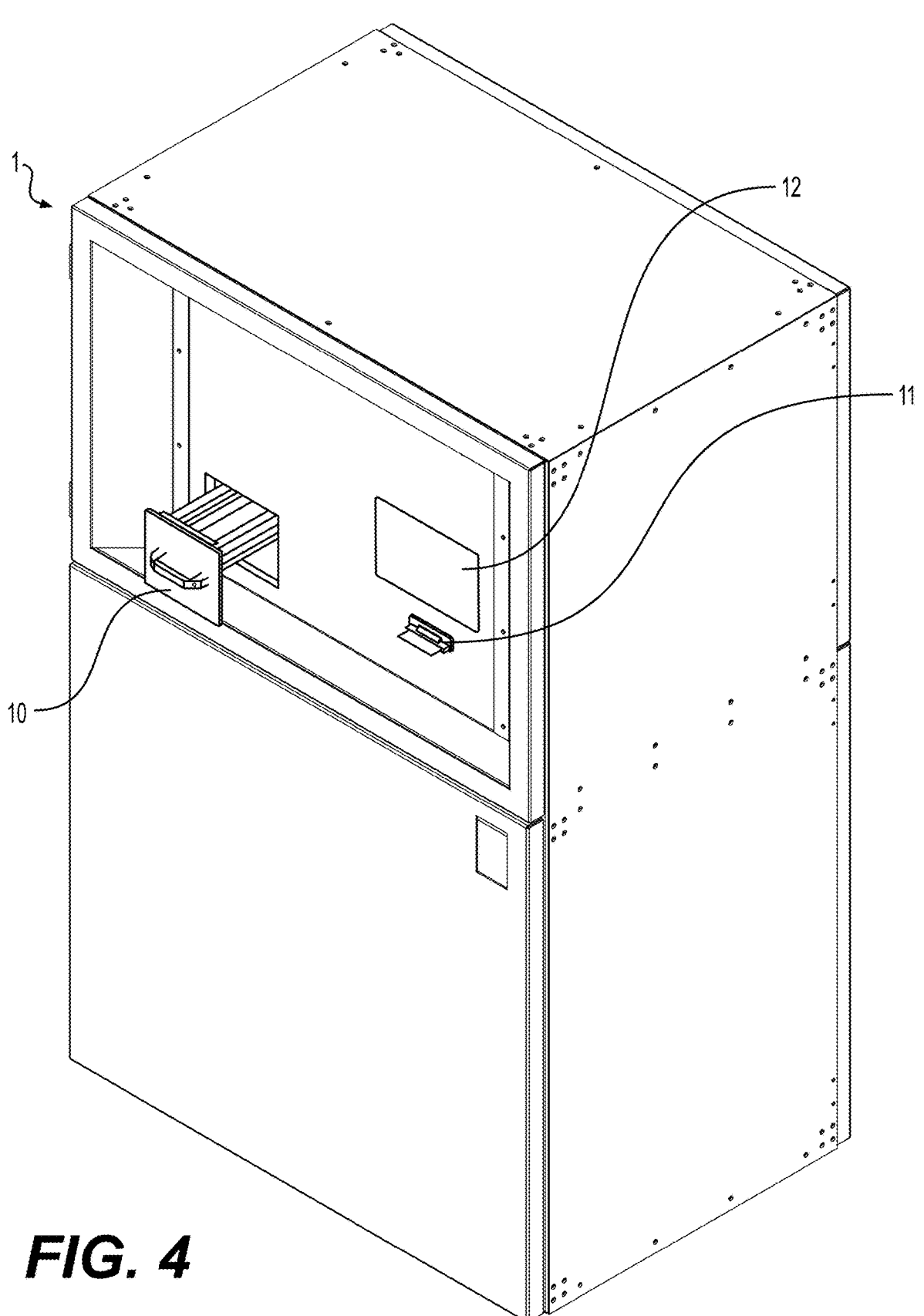
FIG. 4 is another perspective view of the hard drive destruction device of FIG. 1.
Figure 5:
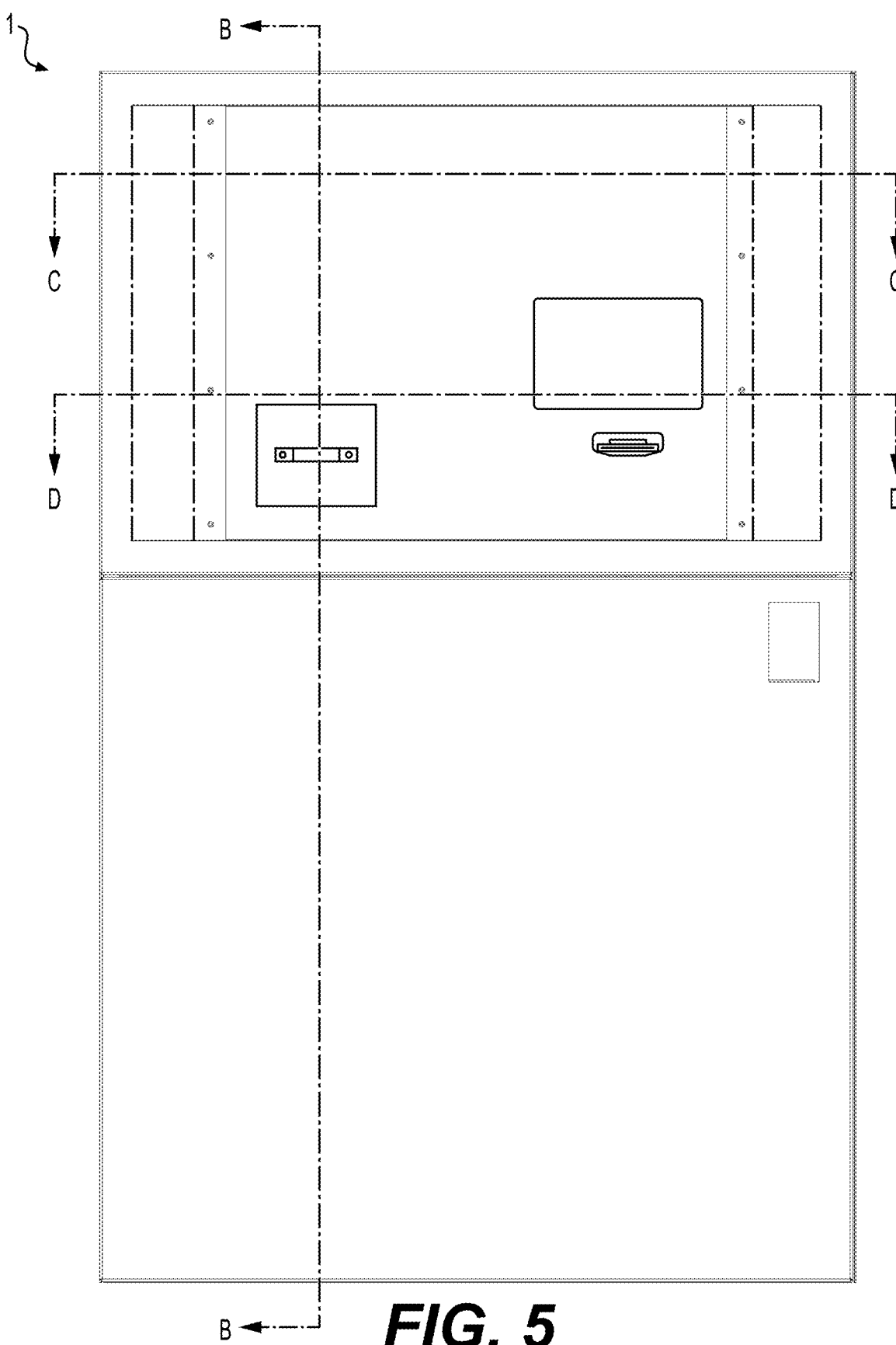
FIG. 5 is a front view of the hard drive destruction device of FIG. 4.
Figure 6:
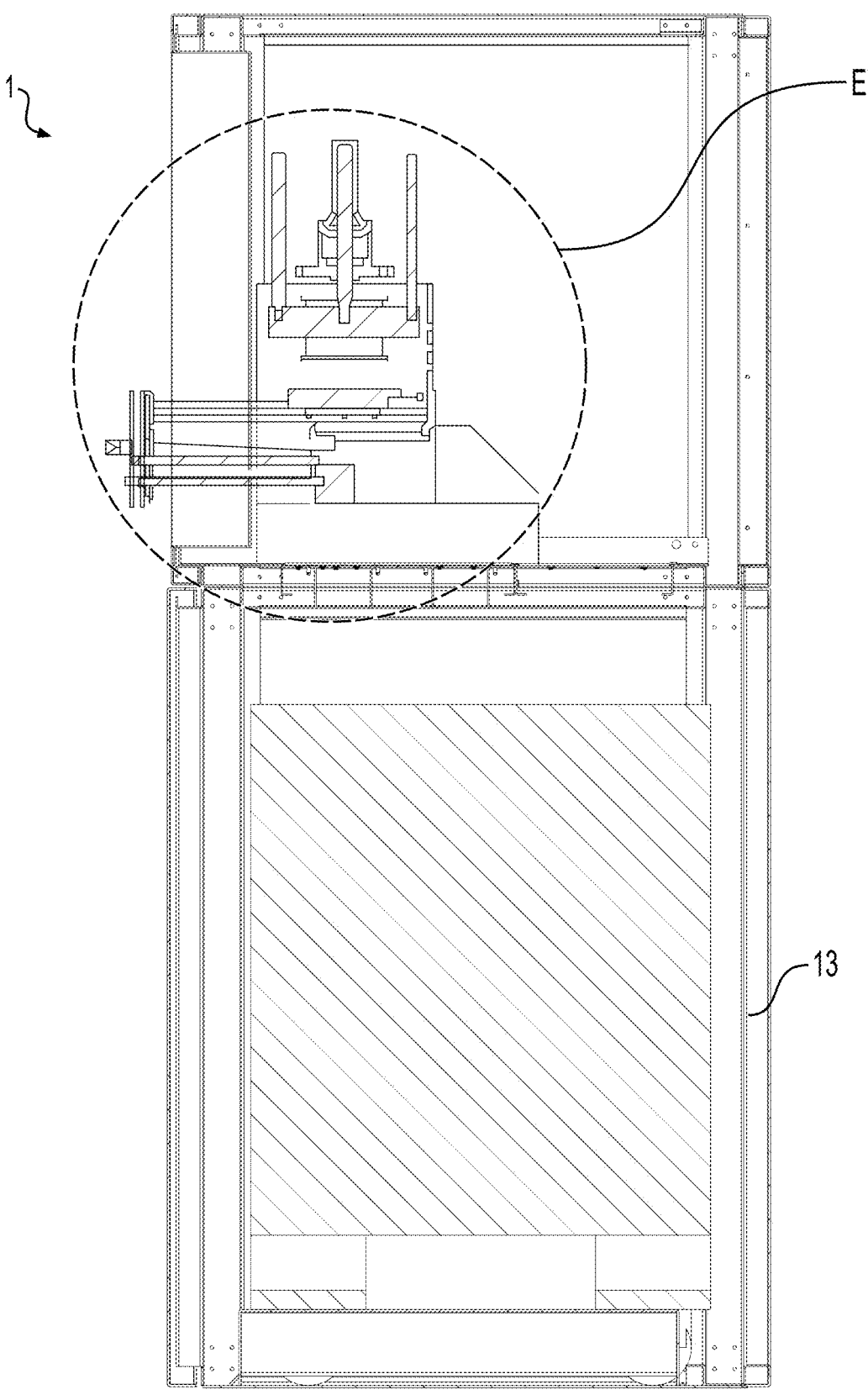
FIG. 6 is a cross-sectional view of the hard drive destruction device of FIG. 4, taken along line B-B of FIG. 5.
Figure 7:
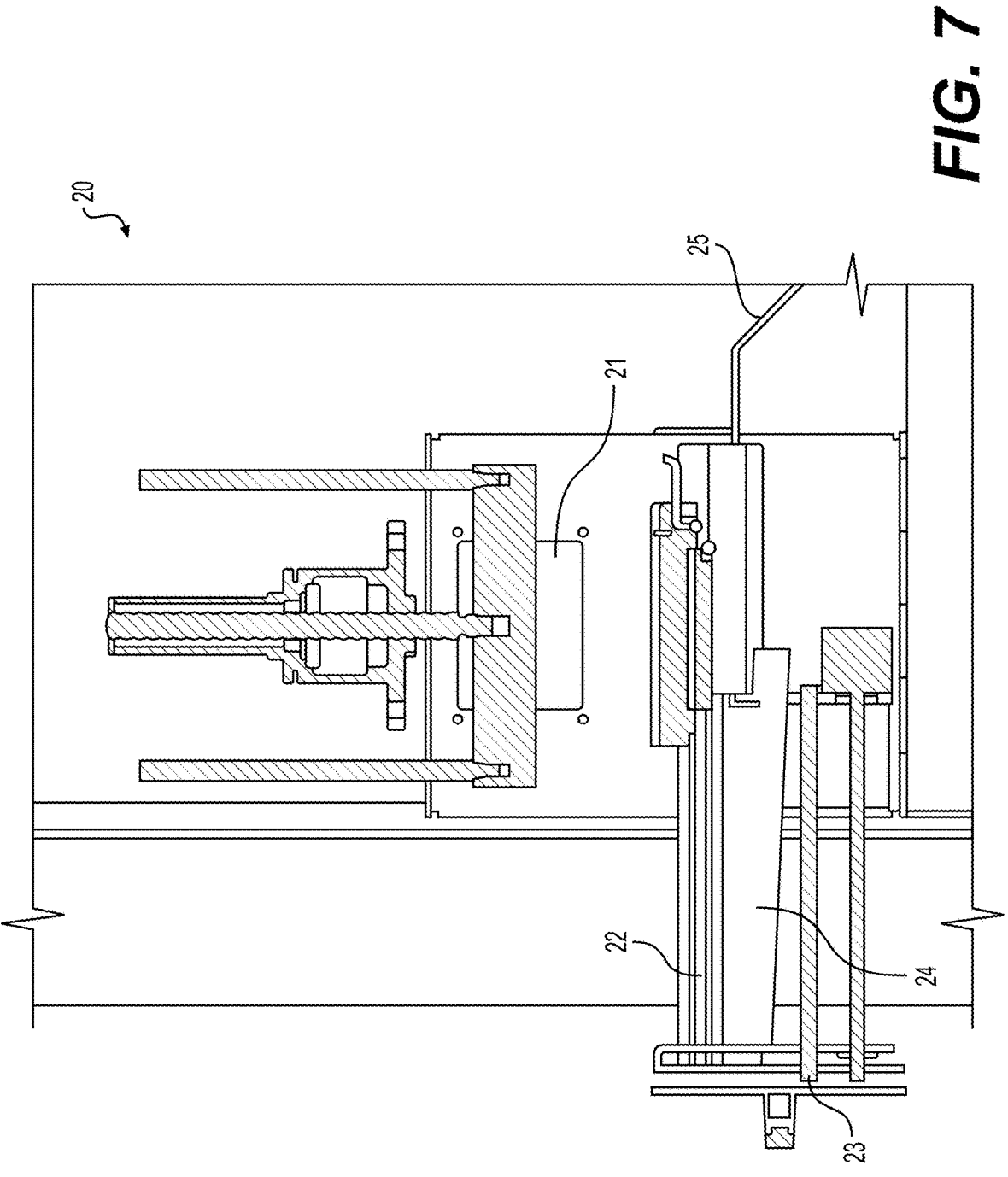
FIG. 7 is an inset view of portion "E" of the hard drive destruction device of FIG. 6.
Figure 8:
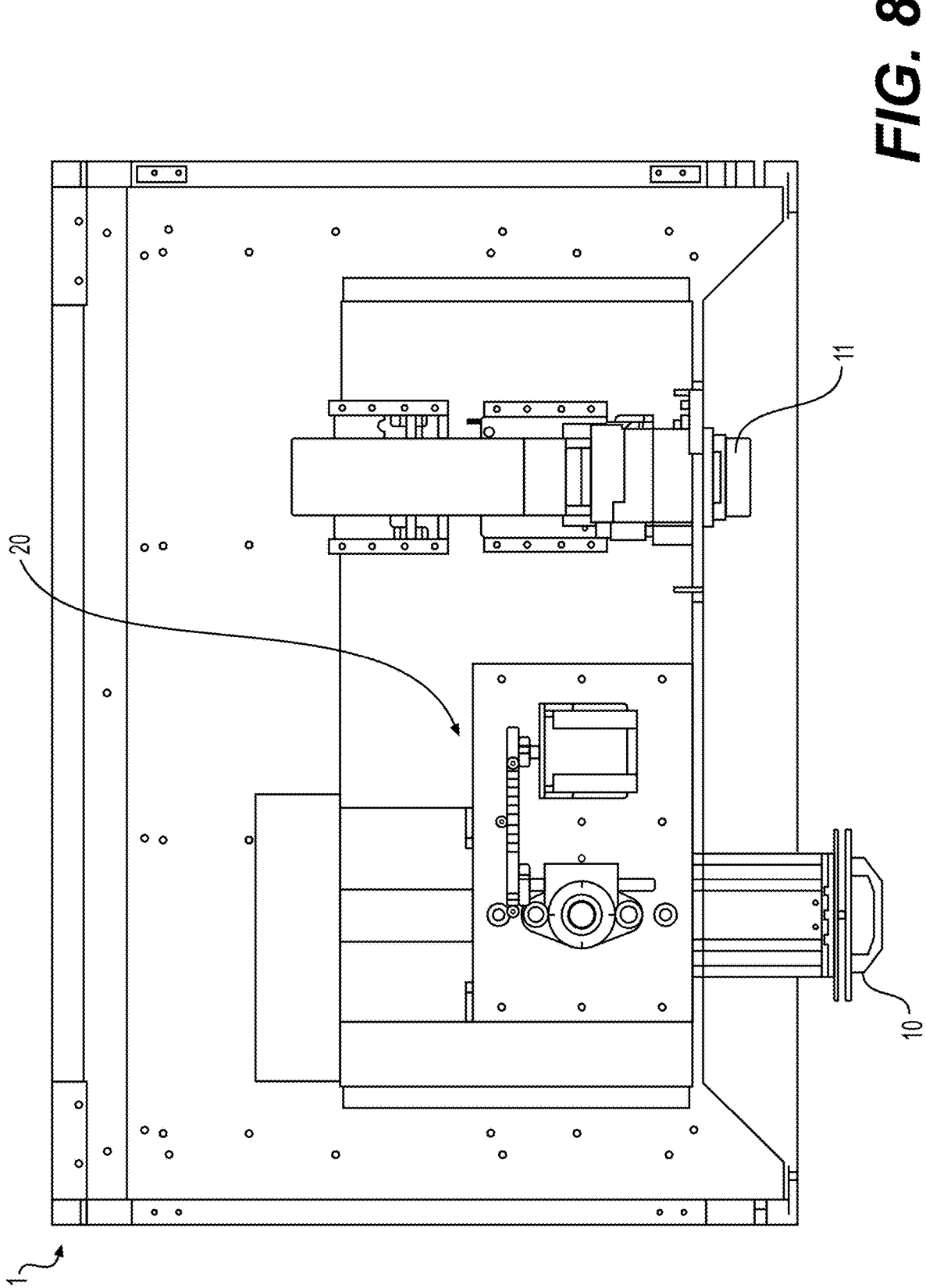
FIG. 8 is a cross-sectional view of the hard drive destruction device of FIG. 4, taken along line C-C of FIG. 5.
Figure 9:
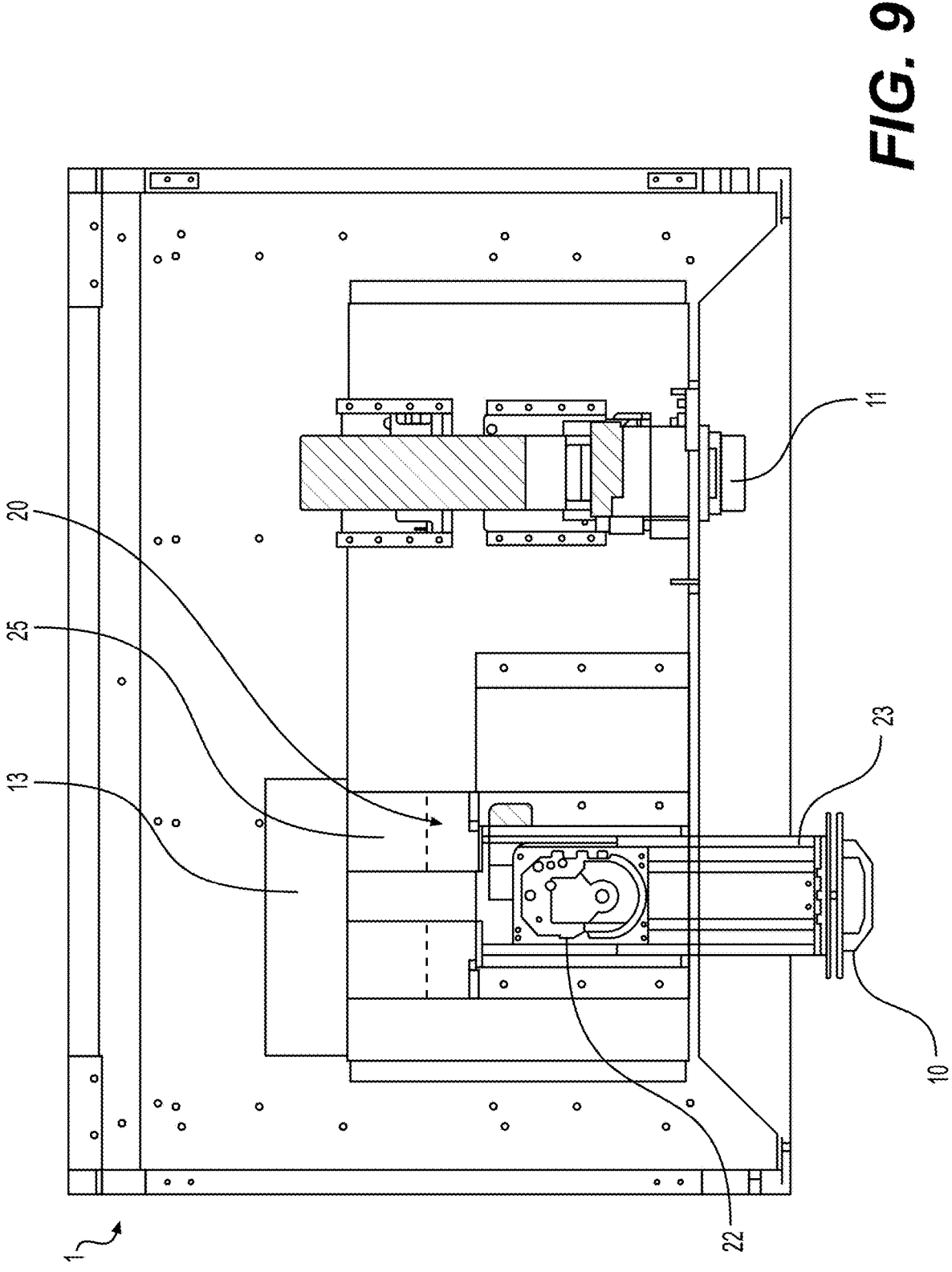
FIG. 9 is a cross-sectional view of the hard drive destruction device of FIG. 4, taken along line D-D of FIG. 5.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. It is to be understood that the exemplary embodiments are described in a generic and explanatory sense only and not for the purpose of limitation, and the disclosure is not limited to the exemplary embodiments described herein. This disclosure may, however, be embodied in different forms and should not be construed as limited to the exemplary embodiments set forth herein. Rather, these exemplary embodiments are provided so that this disclosure will be thorough and complete, and will fully convey the scope of the disclosure to those skilled in the art. In other instances, well-known structures and devices may be shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements. Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A hard drive destruction device according to exemplary embodiments of the present disclosure, generally referred to herein as a kiosk, may be deployed in public places, and is convenient to be transported and relocated. The kiosk is designed to be user-friendly and enable consumers to have their hard drives shredded on-site. The kiosk will be monitored using back-end software to ensure timely replacement of storage bins and transfer of shredded hard drives to recycling sites.

The kiosk may also be deployed in a data center. Data centers may have a substantial need for record management, such as mandatory destruction of hard drives after set periods of time, for security purposes. Data centers cannot have dust or other airborne contaminants, however. Therefore, hard drives may typically be removed from data centers and shredded off-site. Physical crushing of hard drives is a method of hard drive destruction within a data center.

The kiosk may have various destruction methods. Standard: this destruction method requires the user to input the amount of drives they would like to process, optionally a ticket number, and then verify the contents of each drive as they are processed. Once they have processed the amount of drives they entered, the program will show the finished screen with a QR code. The QR code may be a link to a website where the user can view their records. Continuous: this destruction method omits the amount of drives input by the user, optionally includes the ticket number, and requires verification of the contents of each drive as they are processed. At any given time, the user may finish their session. Finishing their session will show the same finished screen with the QR code. This mode may not be limited by any means other than space limitations within the kiosk collection bin. Continuous without verification: this destruction method is much like the continuous method, however, it does not require the user to verify the contents of each drive as they are processed.

As shown in FIG. 1, FIG. 2, FIG. 3, FIG. 4, FIG. 5, FIG. 6, FIG. 7, FIG. 8, and FIG. 9, the hard drive destruction device according to exemplary embodiments includes a kiosk 1 having a touch screen user interface 11 for user options and hard drive destruction service selection, and a credit card reader 12 for payments. The kiosk 1 also includes a crushing ram unit 20 compatible with a variety of hard drive sizes and types (not shown). The crushing ram unit 20 includes a drive receiver 22 that accommodates both standard 3.5 inch and 2.5 inch hard drives, both mechanical and solid state. A user of the kiosk 1 accesses the drive receiver 22 via a portal 10. A crushing ram head 21 is used to crush the inserted hard drive. The crushing ram unit 20 also includes a catch plate 24 that keeps hard drives from falling through prior to ejection to a collection bin 13. A drive ejection mechanism 23 is used to eject the crushed drive and any loose remnants along a drive sled 25, into the collection bin 13. The crushing ram unit 20 is designed to avoid jamming and requires no intervention from the user.

The kiosk 1 may be an apparatus not only for destruction of hard drives, but other small form factors and/or types of electronic equipment, such as a portable memory device, a portable storage device, a mobile phone, a smartphone, a tablet personal computer, a mobile communication terminal, an electronic notebook, an electronic book, and a portable multimedia player (PMP), but also various other products as may be appreciated by those skilled in the pertinent art to which this disclosure pertains. The small form factor and/or electronic equipment may be such a product as described above or a part thereof. For convenience of explanation, exemplary embodiments are illustrated herein in which the small form factor and/or electronic equipment is a hard drive.

The hard drive destruction device may be a kiosk 1 as described herein, but also may be embodied as another type of industrial or commercial equipment or product as may be appreciated by those skilled in the pertinent art to which this disclosure pertains. The hard drive destruction device may not include a user interface, or may not be a stand-alone kiosk, for example.

As shown in FIG. 10, software for managing the hard drive destruction device includes an artificial intelligence and/or machine learning software component used to detect hard drives inserted into the kiosk 1, and which assists with ensuring chain-of-custody information, such as generating a certificate of destruction based on reading the inserted hard drive serial numbers. The software may be stored by a memory in the hard drive destruction device or remotely, such as a separate computer or cloud-based non-transitory memory. According to the present exemplary embodiment, the software includes a cloud-based data storage component to help manage users, kiosks, and chain-of-custody information. The software records the location, operational status, reporting, and bin information of the kiosk 1 for recycler collection notices.

According to the present exemplary embodiment, the kiosk 1 includes a camera connected to the crushing ram unit 20, and the artificial intelligence and/or machine learning software component is configured to capture images of a user's hard drive as inserted into the kiosk 1. The captured images are used by the artificial intelligence and/or machine learning software component to verify that the inserted hard drive is actually a hard drive (non-hard drives will be rejected), and to abstract make, model, serial number, and other information for use in chain-of-custody documentation. The captured images, verification information, and chain-of-custody documentation may be stored by a memory in the kiosk 1 or remotely, such as a separate computer or cloud-based non-transitory memory. According to the present exemplary embodiment, captured images, verification information, and chain-of-custody documentation may be accessed by a user via a back-end cloud-based data storage component of the software.

Figure 11:
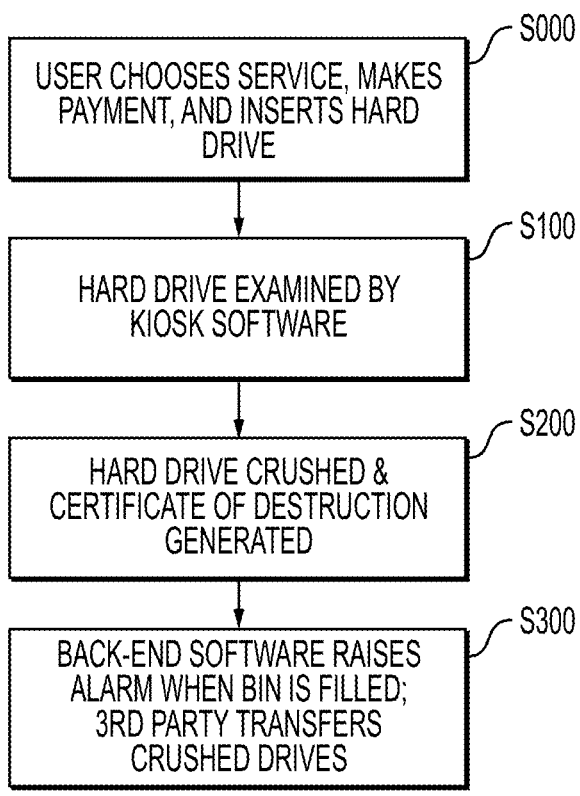
FIG. 11 is a flowchart illustrating a method of operation of the hard drive destruction device according to the exemplary embodiment of FIG. 1.
Figure 12:
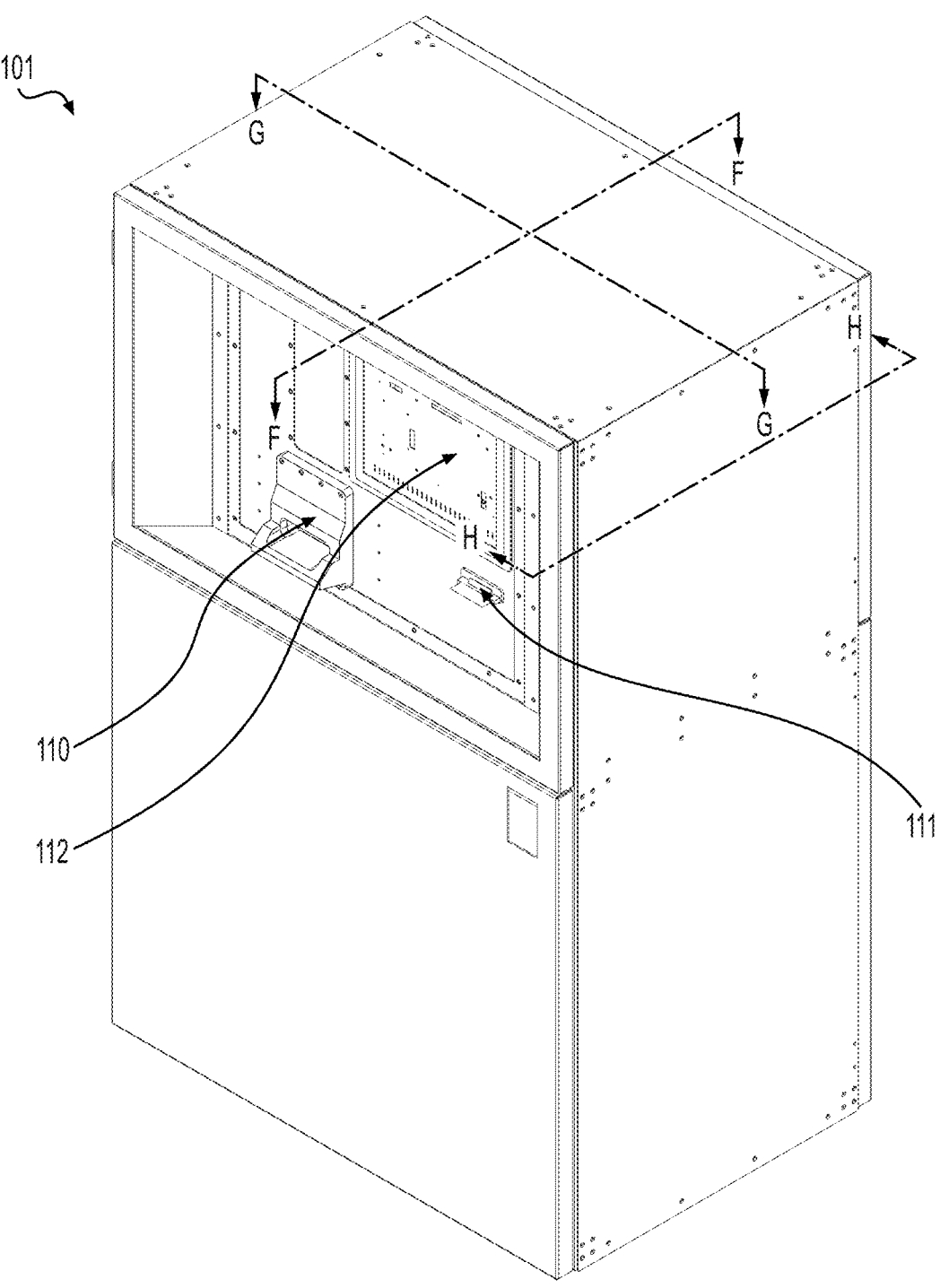
FIG. 12 is a perspective view of a hard drive destruction device according to another exemplary embodiment.
Figure 13:
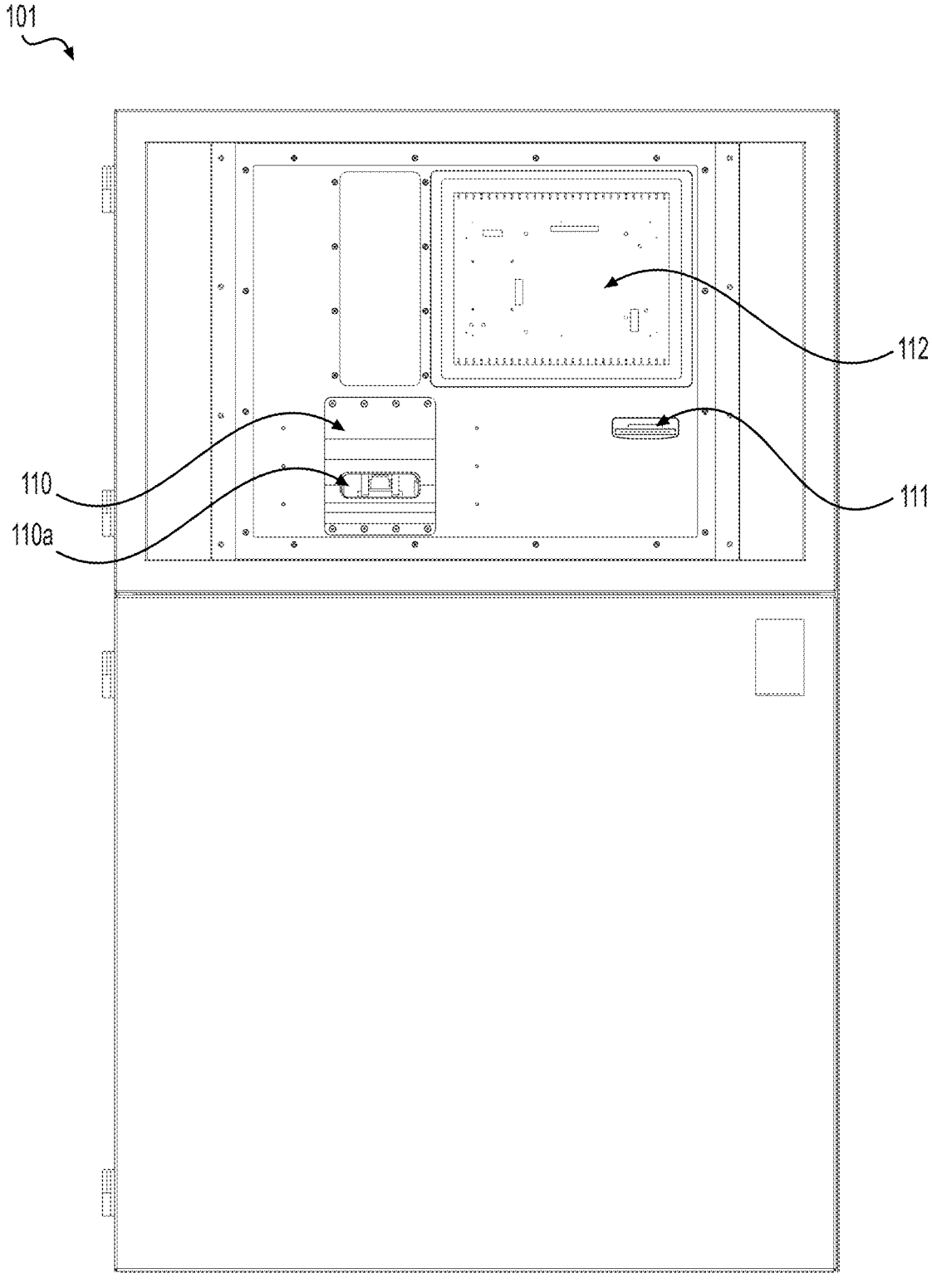
FIG. 13 and FIG. 14 is a front view of the hard drive destruction device of FIG. 12.
Figure 14:
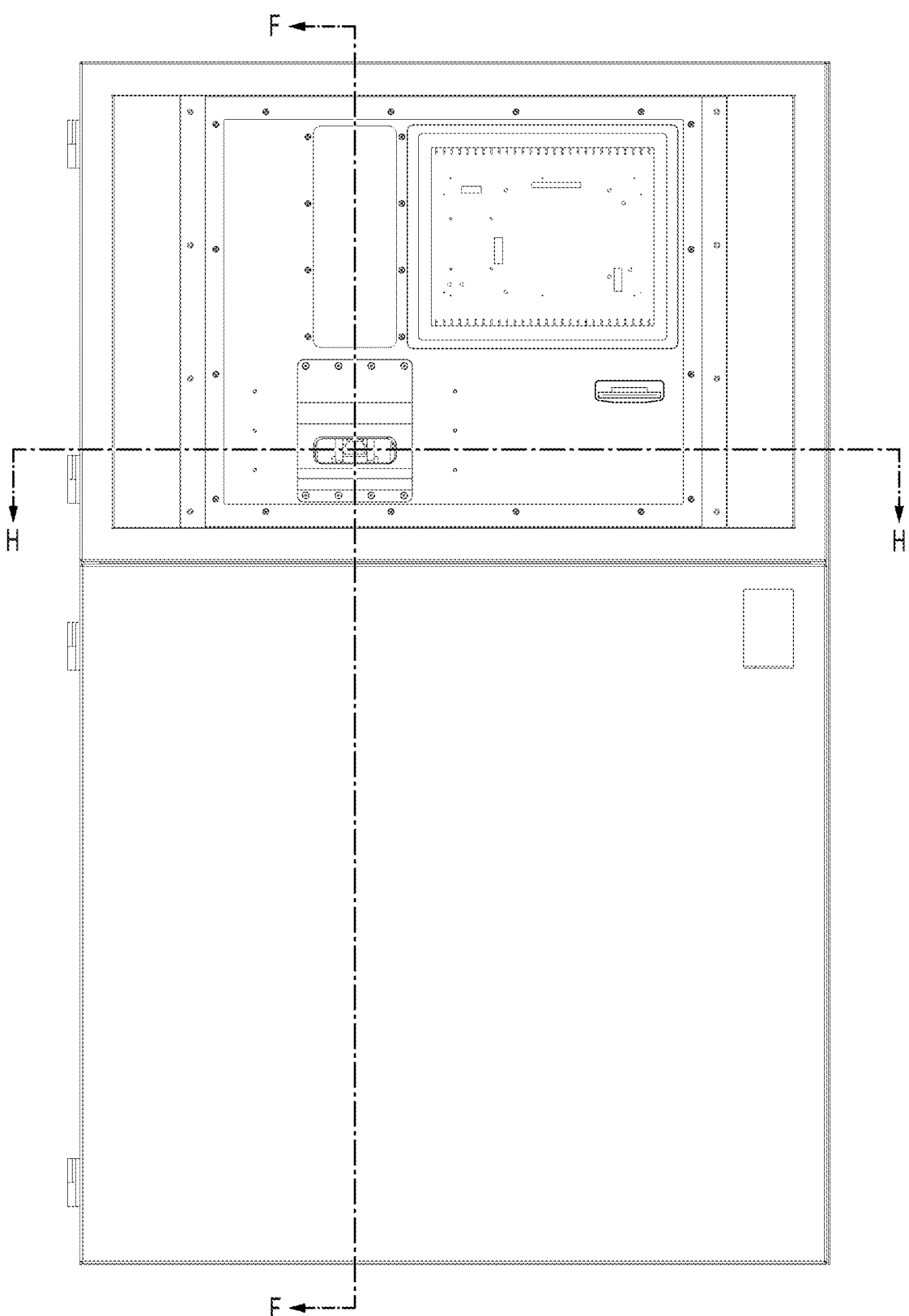
Figure 15:
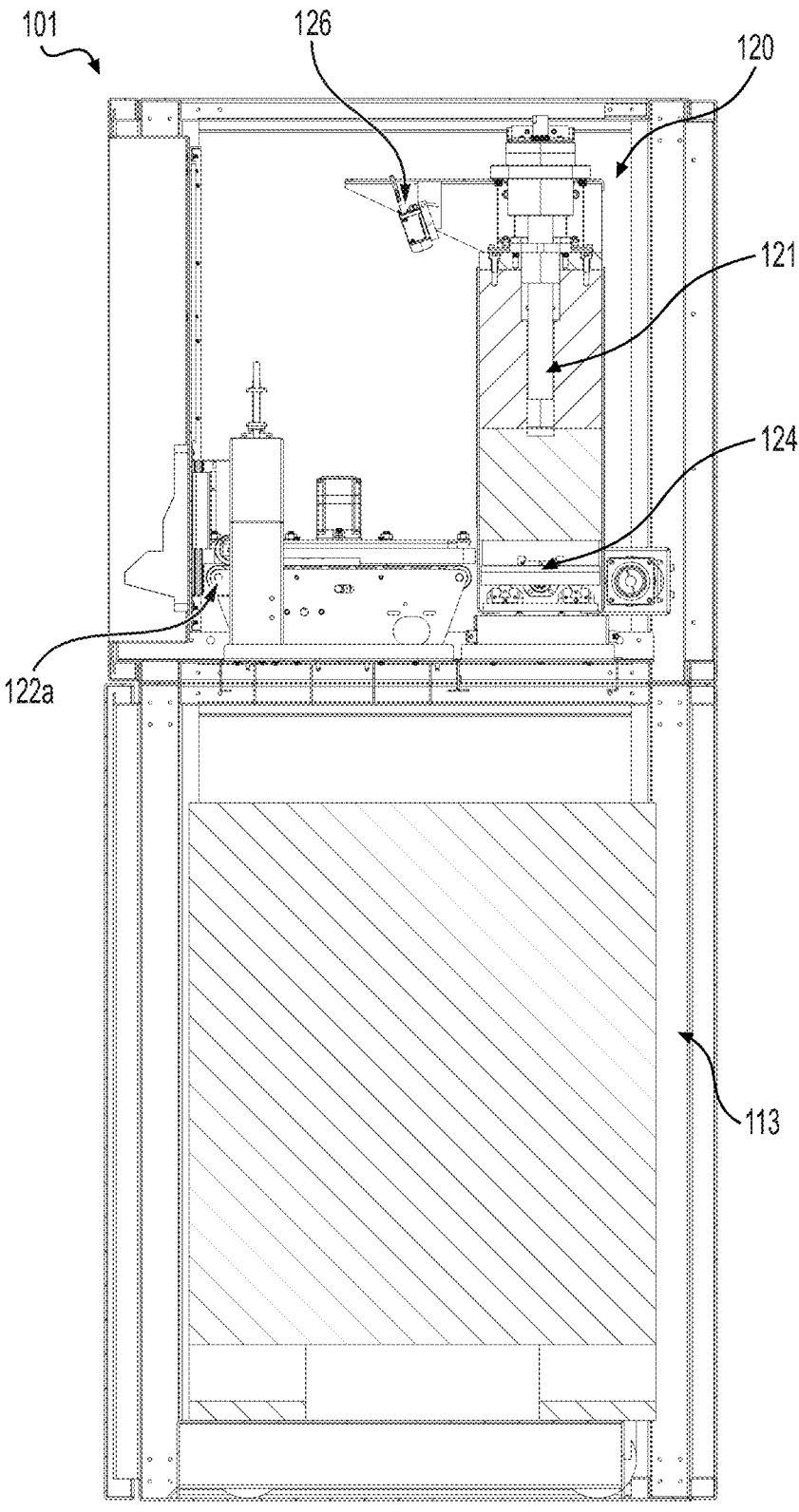
FIG. 15 is a cross-sectional view of the hard drive destruction device of FIG. 12, taken along line F-F of FIG. 12.
Figure 16:
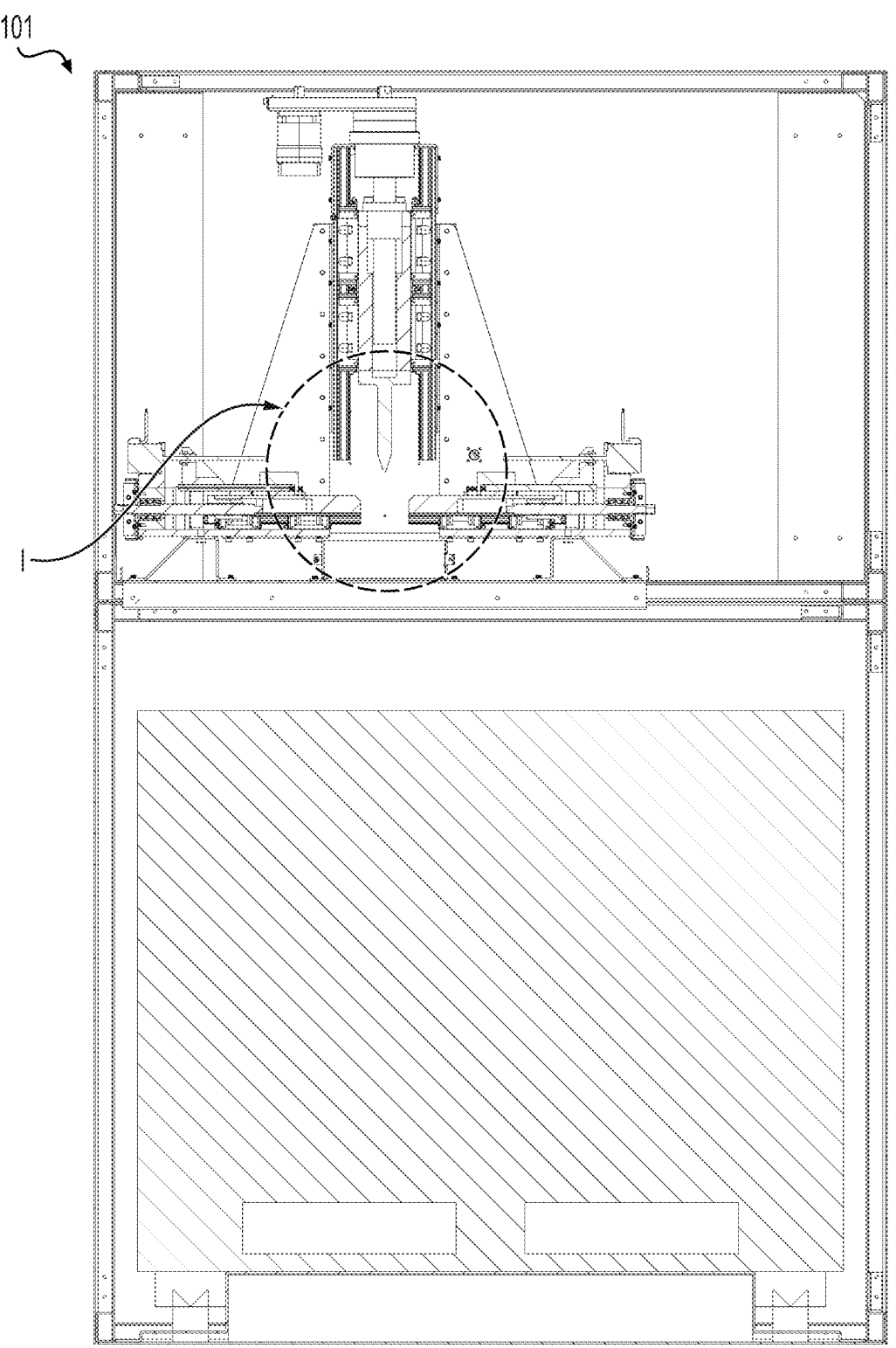
FIG. 16 is a cross-sectional view of the hard drive destruction device of FIG. 12, taken along line G-G of FIG. 12.
Figure 17:
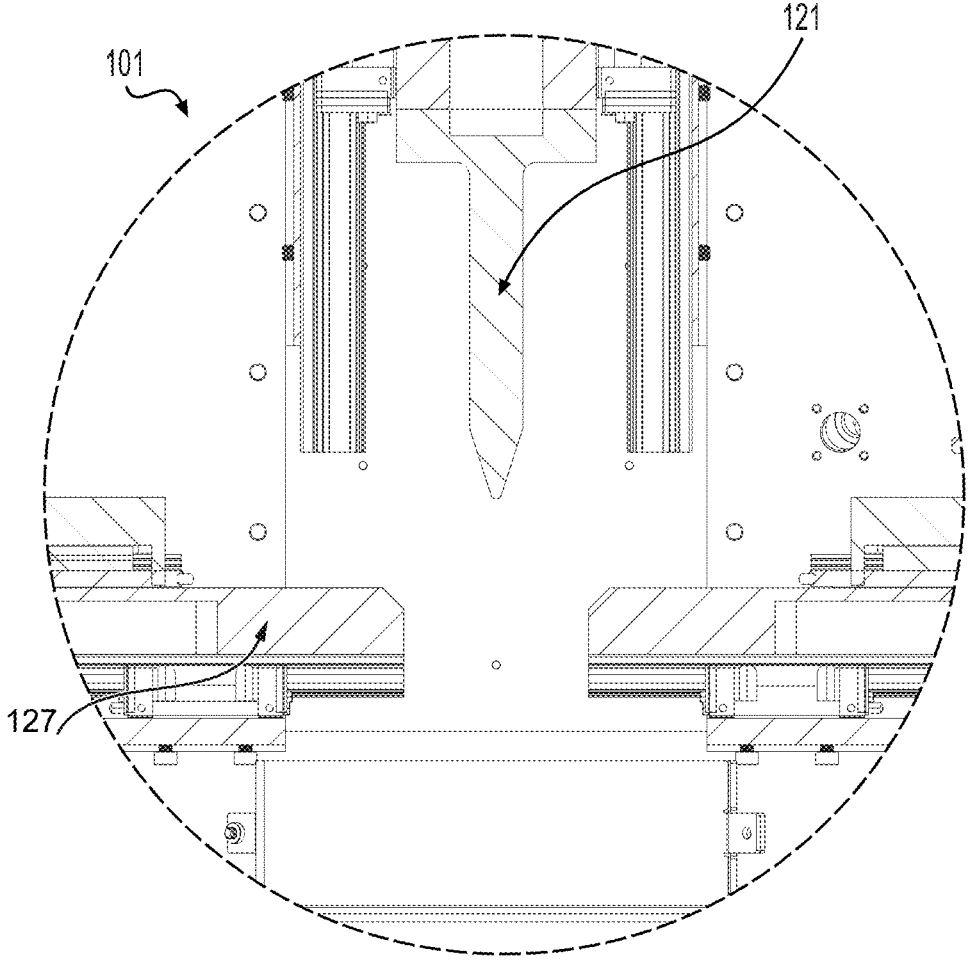
FIG. 17 is an inset view of portion "I" of the hard drive destruction device of FIG. 16.
Figure 18:
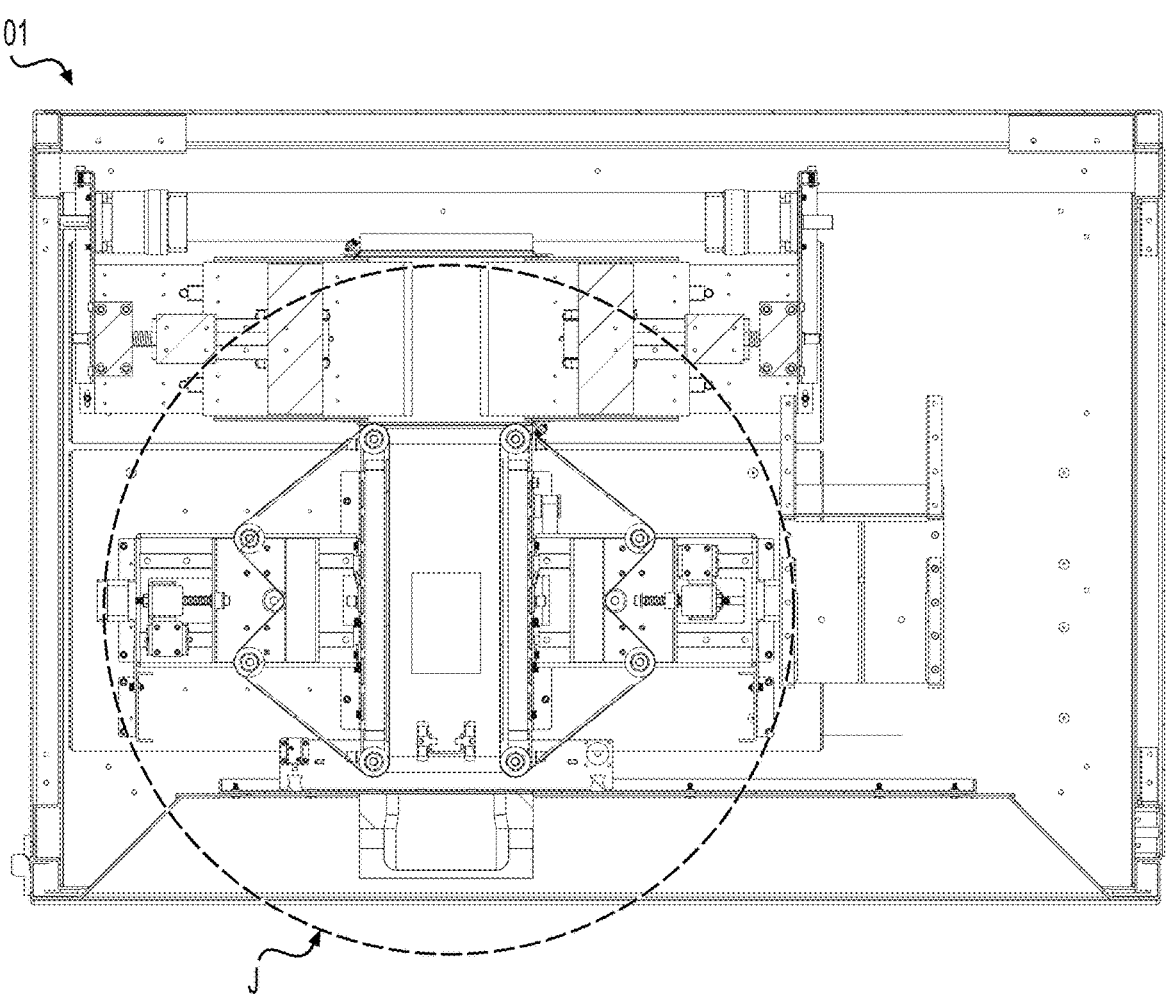
FIG. 18 is a cross-sectional view of the hard drive destruction device of FIG. 12, taken along line H-H of FIG. 12.
Figure 19:
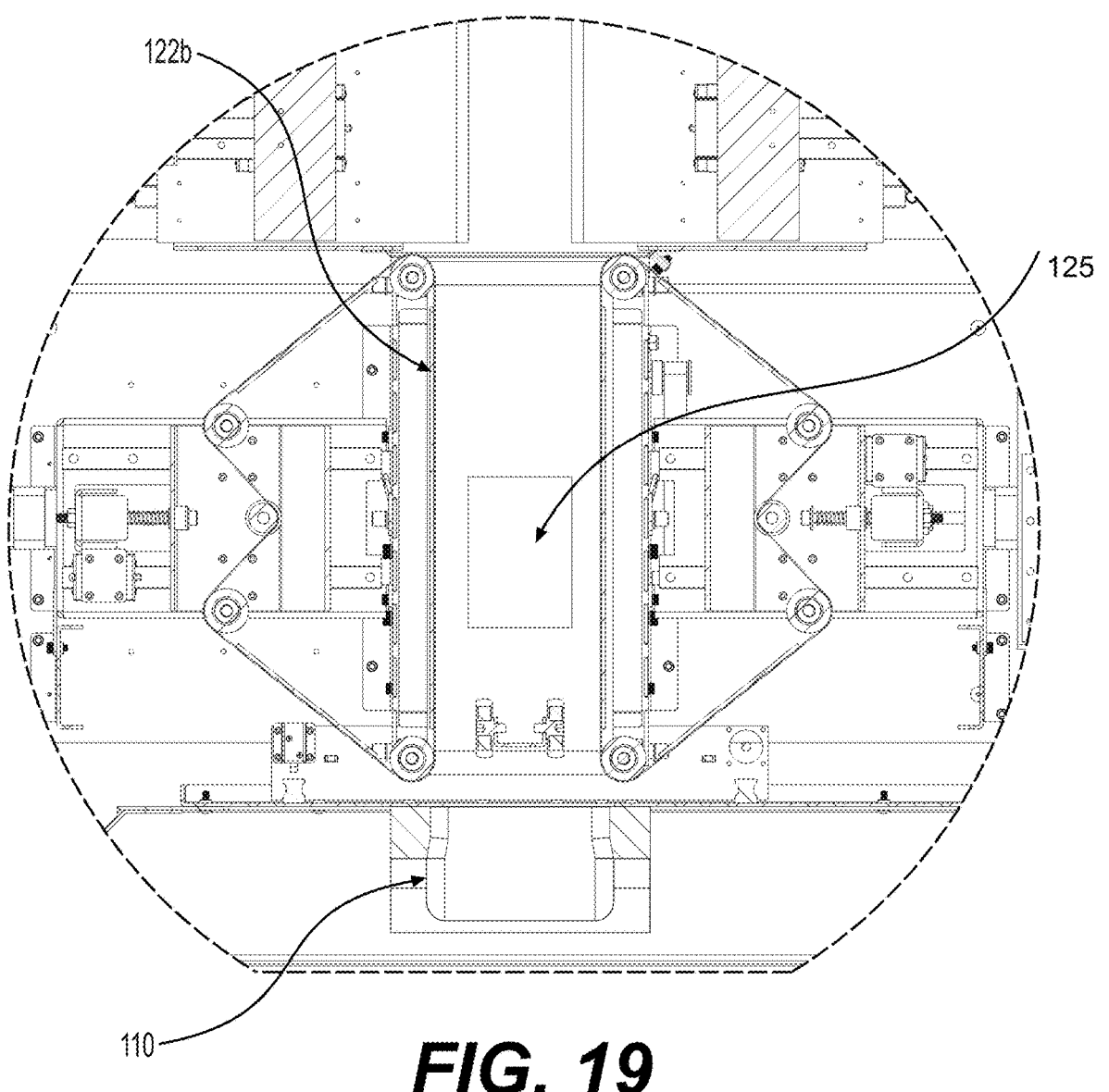
FIG. 19 is an inset view of portion "J" of the hard drive destruction device of FIG. 18.
Figure 20:
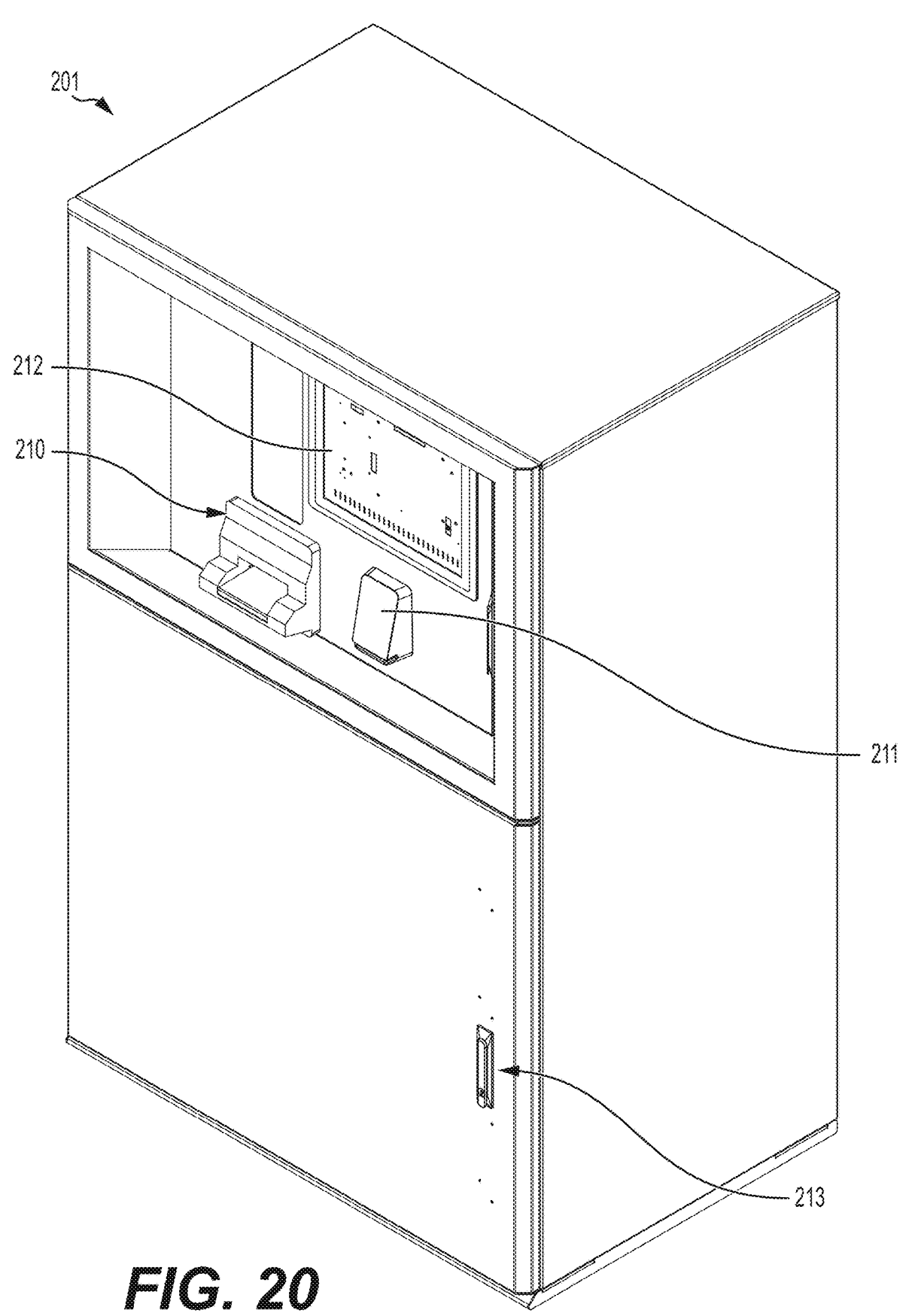
FIG. 20 is a perspective view of a hard drive destruction device according to another exemplary embodiment.
Figure 21:
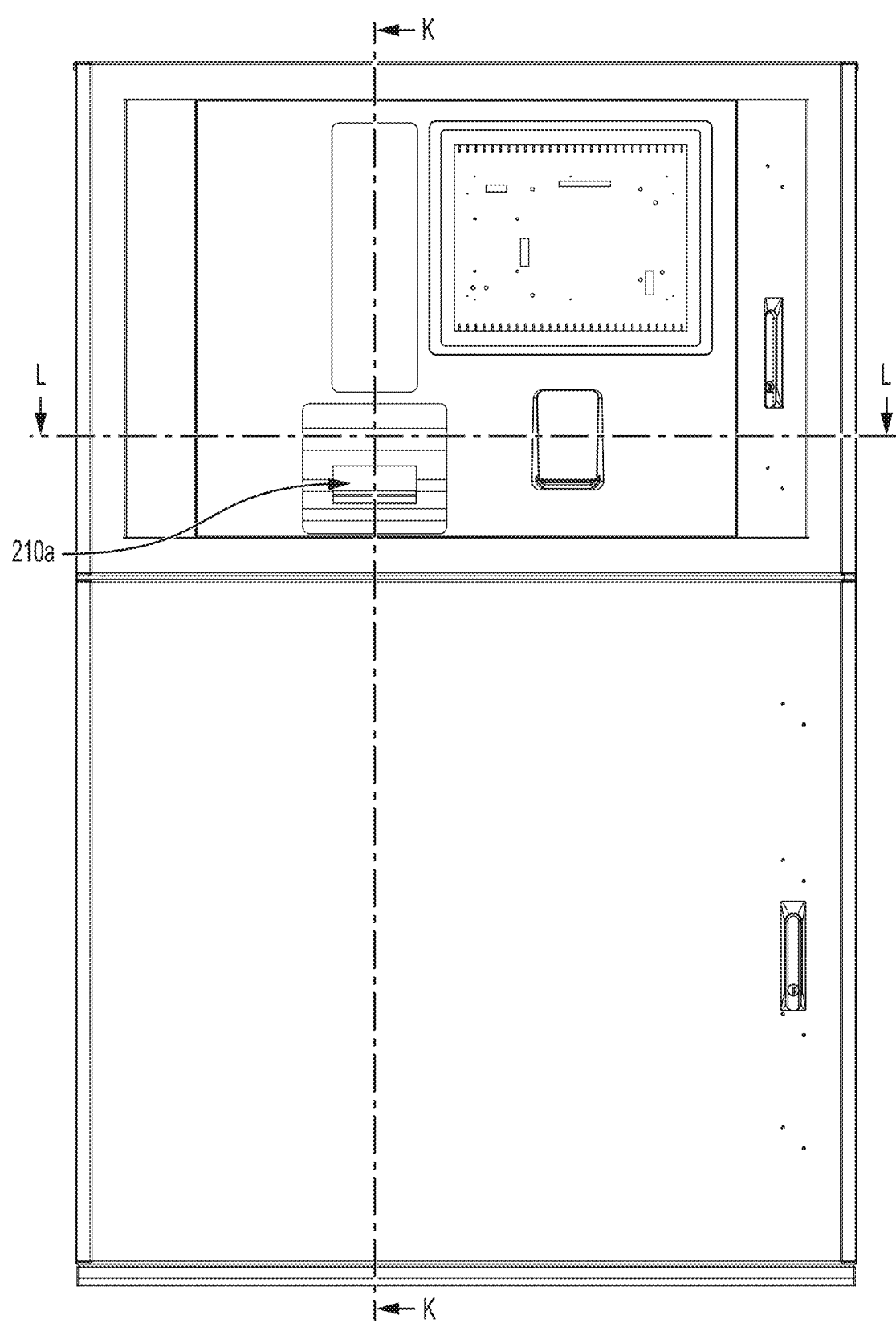
FIG. 21 is a front view of the hard drive destruction device of FIG. 20.
Figure 22:
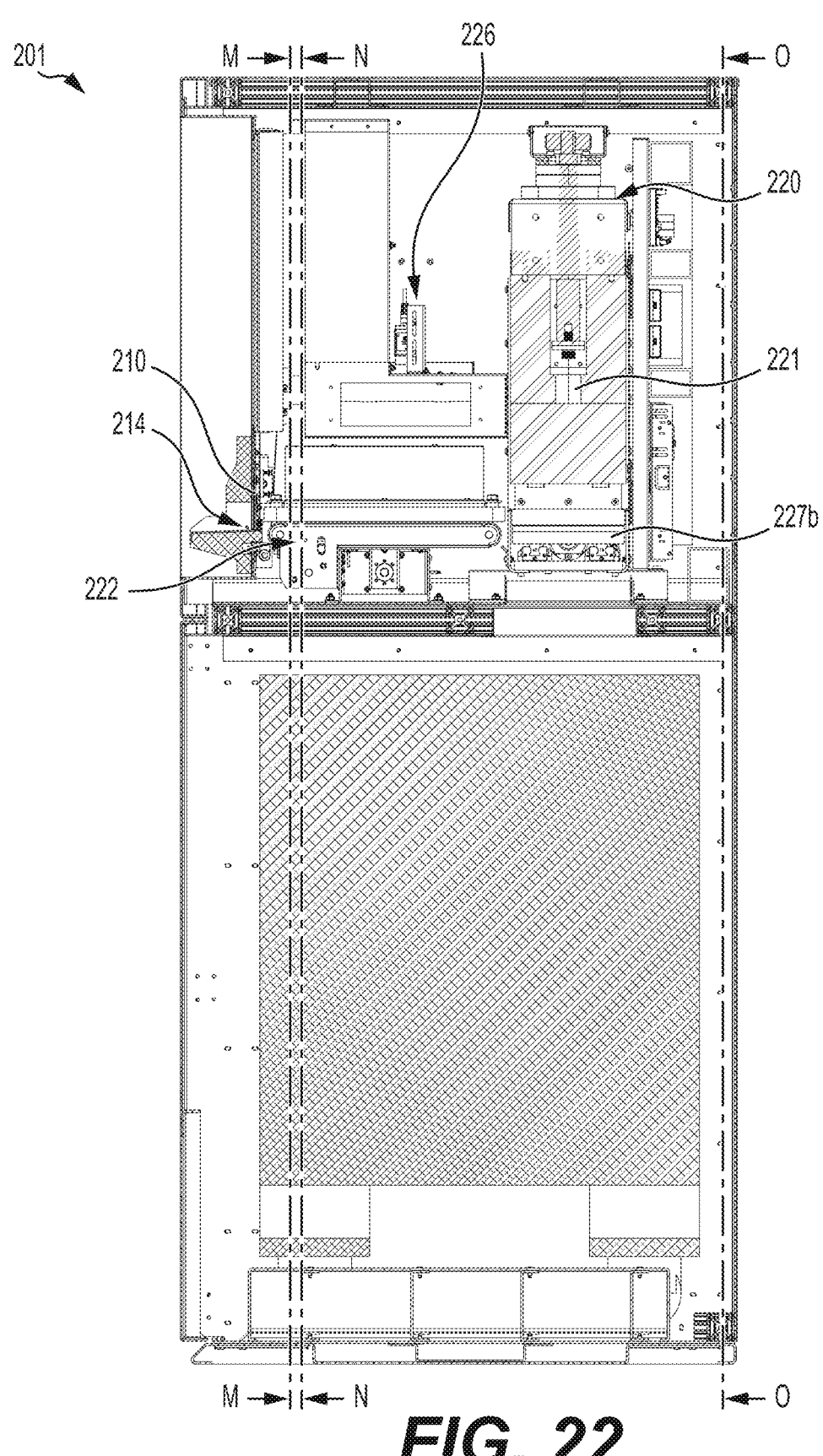
FIG. 22 is a cross-sectional view of the hard drive destruction device of FIG. 20, taken along line K-K of FIG. 21.
Figure 23:
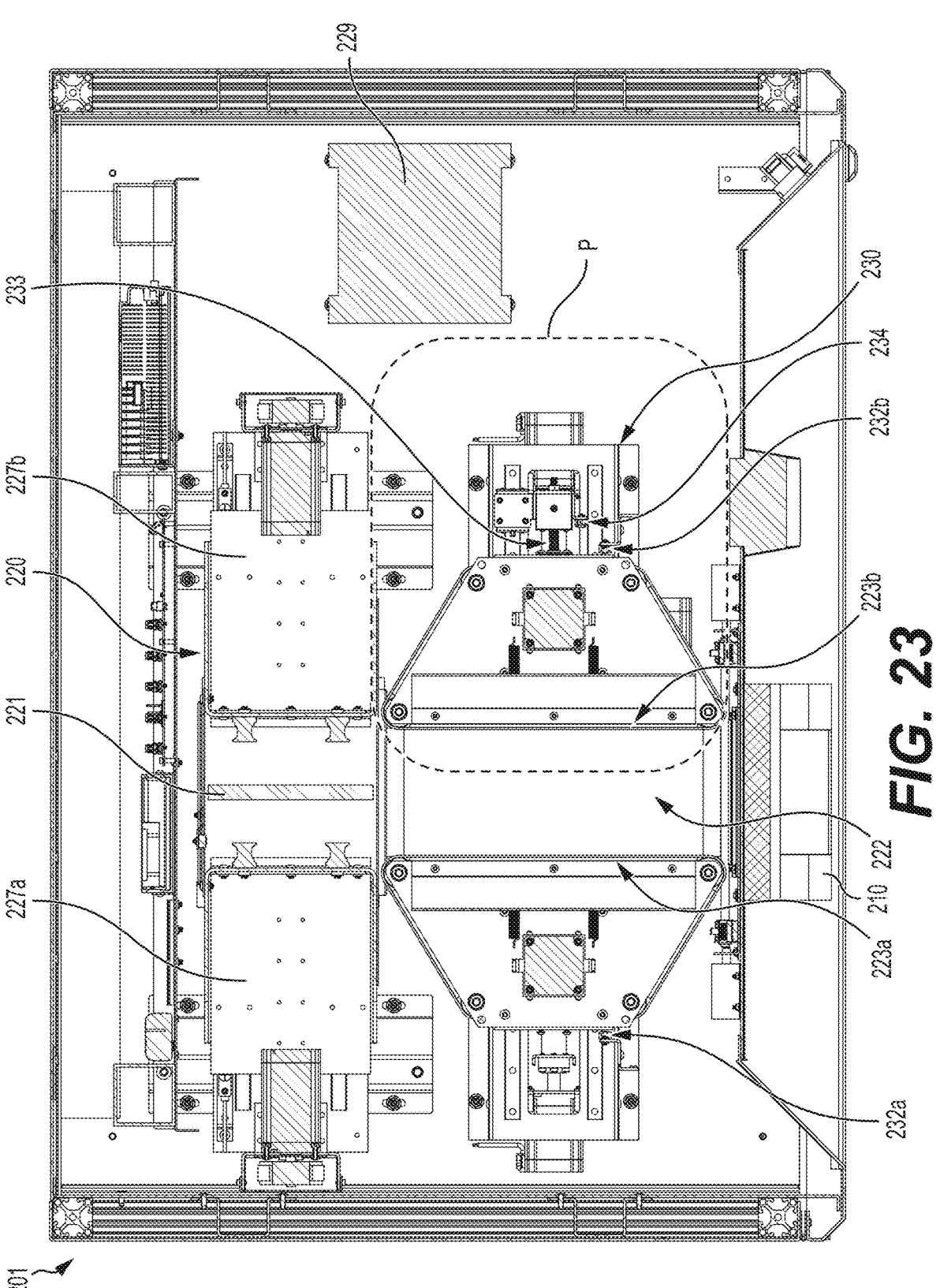
FIG. 23 is a cross-sectional view of the hard drive destruction device of FIG. 20, taken along line L-L of FIG. 21.

FIG. 11 is a flowchart illustrating a method for operating the hard drive destruction device of FIG. 1 according to an exemplary embodiment. Referring to FIG. 11, a method of operation of the hard drive destruction device is started when a user chooses a hard drive destruction service in the kiosk 1, makes a payment using the credit card reader 12, and inserts a hard drive into the drive receiver 22 via the portal 10 (S000). Then, the inserted hard drive is examined by the hard drive destruction device software (S100), including detecting and verifying the hard drive inserted into the kiosk 1 and generating chain-of-custody documentation. The hard drive is then crushed by the crushing ram unit 20 and a certificate of destruction is generated (S200). The back-end software raises an alarm when the collection bin 13 is filled with crushed hard drives, and a third party transfers the crushed drives for final shredding (S300).

FIG. 12, FIG. 13, FIG. 14, FIG. 15, FIG. 16, FIG. 17, FIG. 18 and FIG. 19 show a hard drive destruction device according to an exemplary embodiment. The hard drive destruction device is substantially similar to the hard drive destruction device described above with respect to the exemplary embodiment shown in FIGS. 1-11, and the description thereof is incorporated herein by reference, and any repeated description thereof is omitted. Likewise, the description herein with respect to FIGS. 12-19 is incorporated by reference in the exemplary embodiment shown with respect to FIGS. 1-11.

As shown in FIG. 12, FIG. 13, FIG. 14, FIG. 15, FIG. 16, FIG. 17, FIG. 18 and FIG. 19, the hard drive destruction device according to exemplary embodiments includes a kiosk 101 having an inlet port 110 with an opening 110*a*, a receipt printer 111, and a touch screen user interface 112 for user options and hard drive destruction service selection. The kiosk 101 may include a credit card reader and a viewing window for viewing the hard drive destruction process. The kiosk 101 includes a crushing ram unit 120 compatible with a variety of hard drive sizes and types (not shown).

The crushing ram unit 120 includes a drive receiver that accommodates hard drives, as well as other small form factors and/or electronic devices, as described above. The drive receiver includes a first drive receiver 122*a* that may be a conveyor belt that moves the hard drive horizontally through the crushing ram unit 120 inside the kiosk 101. The user of the kiosk 101 accesses the first drive receiver 122*a* via the portal opening 110*a*. The crushing ram unit 120 also includes second drive receiver 122*b*, which may be at least one vertically disposed conveyor belt that that works in conjunction with the first drive receiver 122*a* to move and/or align the hard drive.

According to the present exemplary embodiment, the drive receiver may accommodate form factors from about zero up to about six inches in diameter, but dimensions according to various embodiments are not limited thereto. A disposable carrier can be used to accommodate small form factors on the drive receiver, so that small dimension form factors can be properly handled.

The inlet port 110 includes a door at the opening 110*a* thereof, as well as light-emitting diodes (LEDs) arranged above and below the opening 110*a*, which create a curtain of light used to detect the presence of an object in the kiosk 101. When an object such as a hard drive is inserted in the inlet port 110, once the hard drive is at least partially inserted through the opening 110*a*, the first drive receiver 122*a* and the second drive receiver 122*b* will operate to pull the hard drive into the kiosk 101. Then the door of the inlet port 110 closes, and no more user involvement is required, and the door seals off the user from touching the hard drive. If the user cancels the hard drive destruction process, or the kiosk 101 detects an incompatible object inserted through the inlet port 110, the door can be reopened and the first drive receiver 122*a* and the second drive receiver 122*b* can move the object backwards to eject it from the opening 110*a*.

A crushing ram head 121 is used to crush the hard drive in a crush chamber. The crushing ram head 121 is activated by software in conjunction with a camera 126, which views the hard drive 125 on the first drive receiver 122*a*. Additional cameras (not shown) can be put in multiple locations in the kiosk 101, such as above or below the viewing window. The software operates as shown in FIG. 10 and FIG. 11, and includes vision software that may be used to identify and classify an object inserted through the inlet port 110 as a hard drive or otherwise compatible object.

When the camera 126 detects a hard drive 125 present on the first drive receiver 122*a*, an optical character recognition (OCR) running on the vision software. The OCR may parse text and/or information printed on the hard drive, such as manufacturer, serial number, manufacture date, and model. The OCR may also read and process barcodes printed on the hard drive. Such information captured by the OCR may be stored as data by a memory in the kiosk 101 or remotely, such as a separate computer or cloud-based non-transitory memory. Once the data has been stored, the user then confirms destruction of the hard drive via the use interface 112.

After the user confirms destruction of the hard drive, the hard drive 125 is pushed into the crush chamber of the crushing ram unit 120 by the first drive receiver 122*a* and the second drive receiver 122*b*. The crush chamber includes lower support member 127 and upper support member, which centers the hard drive within the crush chamber. Then, the crushing ram head 121 is used to crush the hard drive, such as by folding the hard drive in half or bending it at least 90 degrees, to effectively render the drive unusable.

The crushing ram unit 120 also includes a catch plate 124 that keeps the hard drive from falling through prior to ejection to a secure collection bin 113. The catch plate 124 when activated ejects the crushed hard drive into the collection bin 113. The catch plate 124 is connected to the lower support member 127 of the crush chamber, which retract so the crushed hard drive can be deposited into the collection bin 113. The lower support member 127 acts as a vault door, such as a solenoid latch, that can close completely so that no unauthorized items can be dropped into or retrieved from the collection bin 113.

The collection bin 113 acts as a vault and secures the crushed item on the spot within the kiosk 1, and the crushed items will only go straight to a recycler or other authorized retriever. Until an authorized retriever opens the collection bin 113, which may be secured using an X-10 high-security combination lock or similar secure lock, it is tracked and secured, such that the location of the collection bin 113 and its contents is known at all times. Sensors are connected to the collection bin 113 to determine how full the bin is, and the kiosk 101 software communicates how full the collection bin 113 is, and then an authorized retriever can go unlock and open the collection bin 113. Thus, the kiosk 101 serves as a secure storage location for sensitive media.

The software uses the camera 126 to record images of the hard drive, such as pictures and/or video of the entire crush process, maintaining a complete chain of custody. The OCR software of the kiosk 101 permits highly secure drive destruction, by confirming the chain of custody. At least one camera 126 can be used to record video of the entire drive crush process or capture pictures from multiple different angles. The software generates a receipt confirming the crush, which may be a paper receipt from the receipt printer 111. The receipt may include the hard drive serial number and other information stored as data with respect to the hard drive that was crushed. The kiosk 101 permits a discrete number of hard drives to be destroyed while having a complete chain of custody.

The kiosk 101 software may include computer vision and machine learning algorithms. As described in detail above, data is stored pertaining to the information collected by the camera 126 and processed by the OCR software. This data may be used to create a library used to teach what a drive is, in conjunction with the computer vision and machine learning algorithms, so then the software can make decisions on whether an object inserted is a hard drive or other type of destructible form factor.

This further securitizes the process of drive destruction by understanding what certain hard drives look like, if it is actually a hard drive, and if the system's understanding matches the information that the user is trying to put into place (such as when information is manually input via the user interface 112). The kiosk 101 software makes an assessment about whether the details that are entered by the user match the details that are being pulled from the drive, and so the kiosk 101 can make additional security assessments around that comparison. Accordingly, machine learning algorithms in the software add security during the drive destruction process, and closes an additional security gap around destroying a false drive or creating false records.

FIG. 20, FIG. 21, FIG. 22, FIG. 23, FIG. 24, FIG. 25, FIG. 26, FIG. 27, FIG. 28 and FIG. 29 show a hard drive destruction device according to an exemplary embodiment. The hard drive destruction device is substantially similar to the hard drive destruction device described above with respect to the exemplary embodiments shown in FIGS. 1-11 and FIGS. 12-19, and the description thereof is incorporated herein by reference, and any repeated description thereof is omitted. Likewise, the description herein with respect to FIGS. 20-29 is incorporated by reference in the exemplary embodiments shown with respect to FIGS. 1-11 and FIGS. 12-19.

As shown in FIG. 20, FIG. 21, FIG. 22, FIG. 23, FIG. 24, FIG. 25, FIG. 26, FIG. 27, FIG. 28 and FIG. 29, the hard drive destruction device according to exemplary embodiments includes a kiosk 201 having an inlet port 210 with an opening 210a, a reader 211, such as a radio-frequency identification (RFID) or credit card reader, a touch screen user interface 212, and a door latch 213.

The drive receiver 222 may be a conveyor belt that moves the hard drive horizontally inside the kiosk 201. The user of the kiosk 201 accesses the drive receiver 222 via the portal opening 210a. The drive receiver 222 moves the hard drive horizontally through the kiosk 201, whether it be for imaging, positioning, or crushing. A first drive clamp 223a and a second drive clamp 223b is disposed on either side of the drive receiver 222. The first drive clamp 223a and second drive clamp 223b may each be a vertically disposed belt that that works in conjunction with the drive receiver 222 to move and/or align the hard drive.

The first drive clamp 223a and the second drive clamp 223b are used to position the hard drive in the center of the drive receiver 222, and to determine the width of the hard drive. The width is determined on the distance travelled by a second drive clamp 223b motor (as described below). The width determined by the first drive clamp 223a and the second drive clamp 223b may not be completely accurate, and is not strictly used for object detection, but may be used as an aid in determining the hard drive type. Once the hard drive is centered on the drive receiver 222, the first drive clamp 223a and the second drive clamp 223b may act as a guide for the hard drive.

Figure 24:
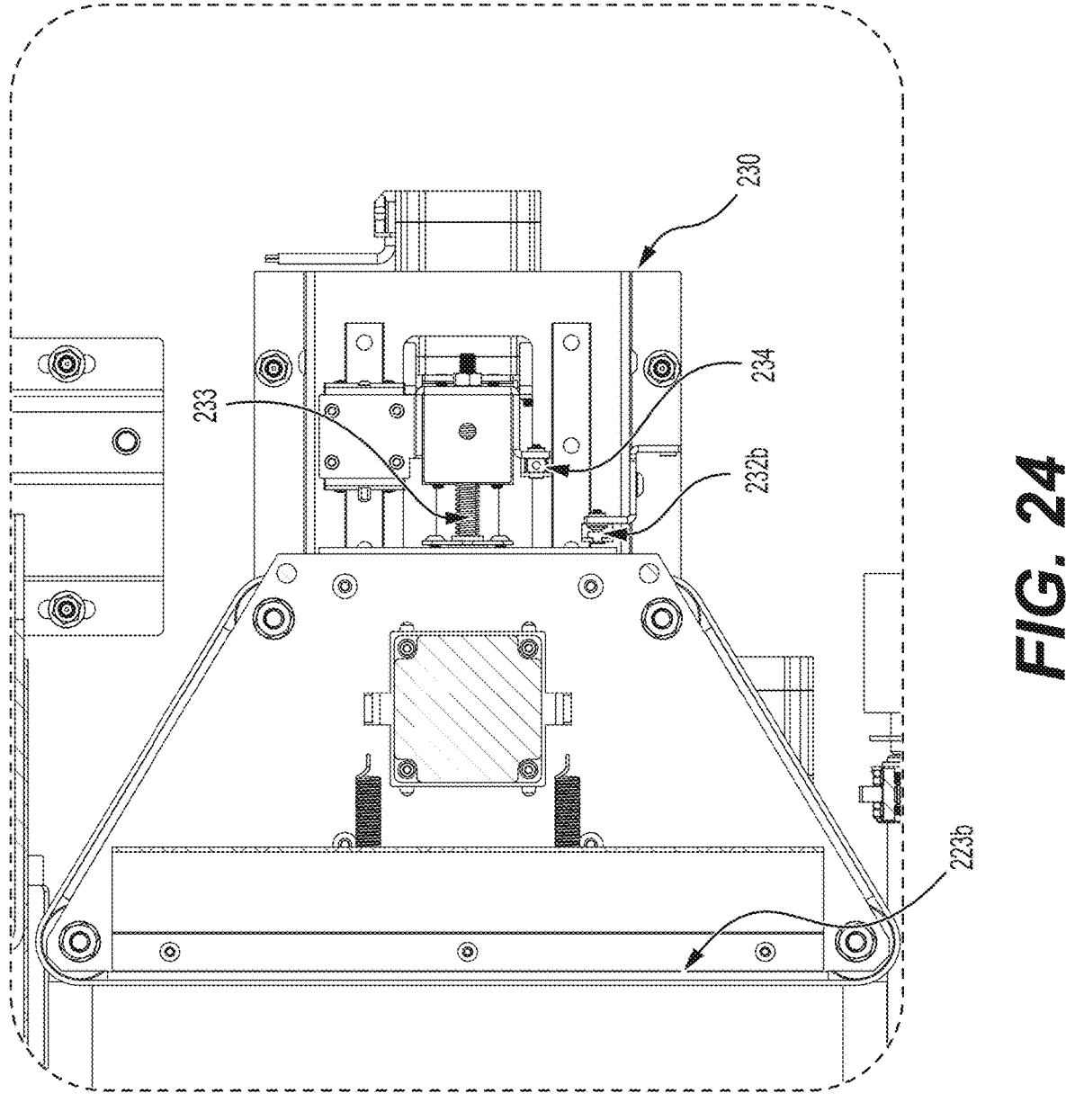
FIG. 24 is an inset view of portion "P" of the hard drive destruction device of FIG. 23
Figure 25:
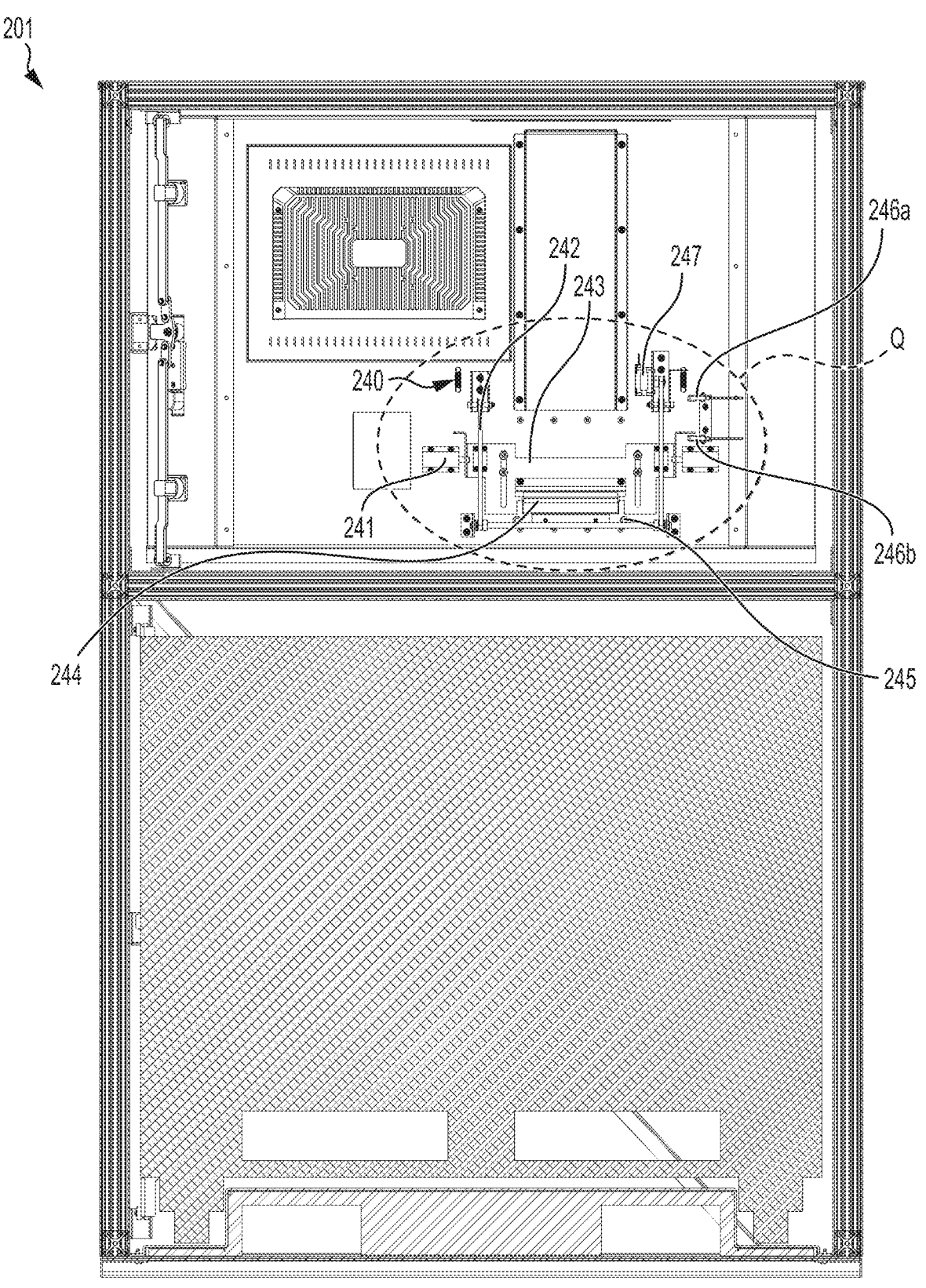
FIG. 25 is a cross-sectional view of the hard drive destruction device of FIG. 20, taken along line M-M of FIG. 22.

As shown in inset "P" in FIG. 24, the second drive clamp 223b may be actuated relative to the drive receiver 222 by a spring 233 connected to a motor. The spring 233 may have a screw disposed therein and connected to the second drive clamp 223b, and which may be connected to a motor. A first drive clamp sensor 232a is connected to the first drive clamp 223a, and a second drive clamp sensor 232b is connected to the second drive clamp 223b. The first drive clamp sensor 232a and second drive clamp sensor 232b, in conjunction with the spring 233 and motor, move relative to each other and center the hard drive on the drive receiver 222. A spring sensor 234 connected to the spring 233 and second drive clamp 223b senses when to stop moving the second drive clamp 223b. The first drive clamp 223a may not have a spring connected thereto, as omitting it may reduce failure potential in the kiosk 201.

The first drive clamp sensor 232a and the second drive clamp sensor 232b measure the width of the hard drive and to help verify that an item inserted in the inlet port 210 is actually a hard drive, for example. The drive clamp sensors further work in conjunction with the camera 226 and implement object recognition to positively identify the item as a hard drive, as described previously. The first drive clamp sensor 232a and the second drive clamp sensor 232b may act as limit sensors and establish a home position of the first drive clamp 223a and the second drive clamp 223b, respectively. The home position may be a position where the first drive clamp 223a and the second drive clamp 223b return before accepting a hard drive.

The camera 226 may capture images of the hard drive to be processed by the artificial intelligence and/or machine learning software. The camera 226 may work in conjunction with the first drive clamp sensor 232a and the second drive clamp sensor 232b, as well as the artificial intelligence and/or machine learning software to identify the item inserted in the kiosk 201 and act as failsafe. The artificial intelligence and/or machine learning software may extrapolate the text on the hard drive faster and more reliably than a human.

Figure 26:
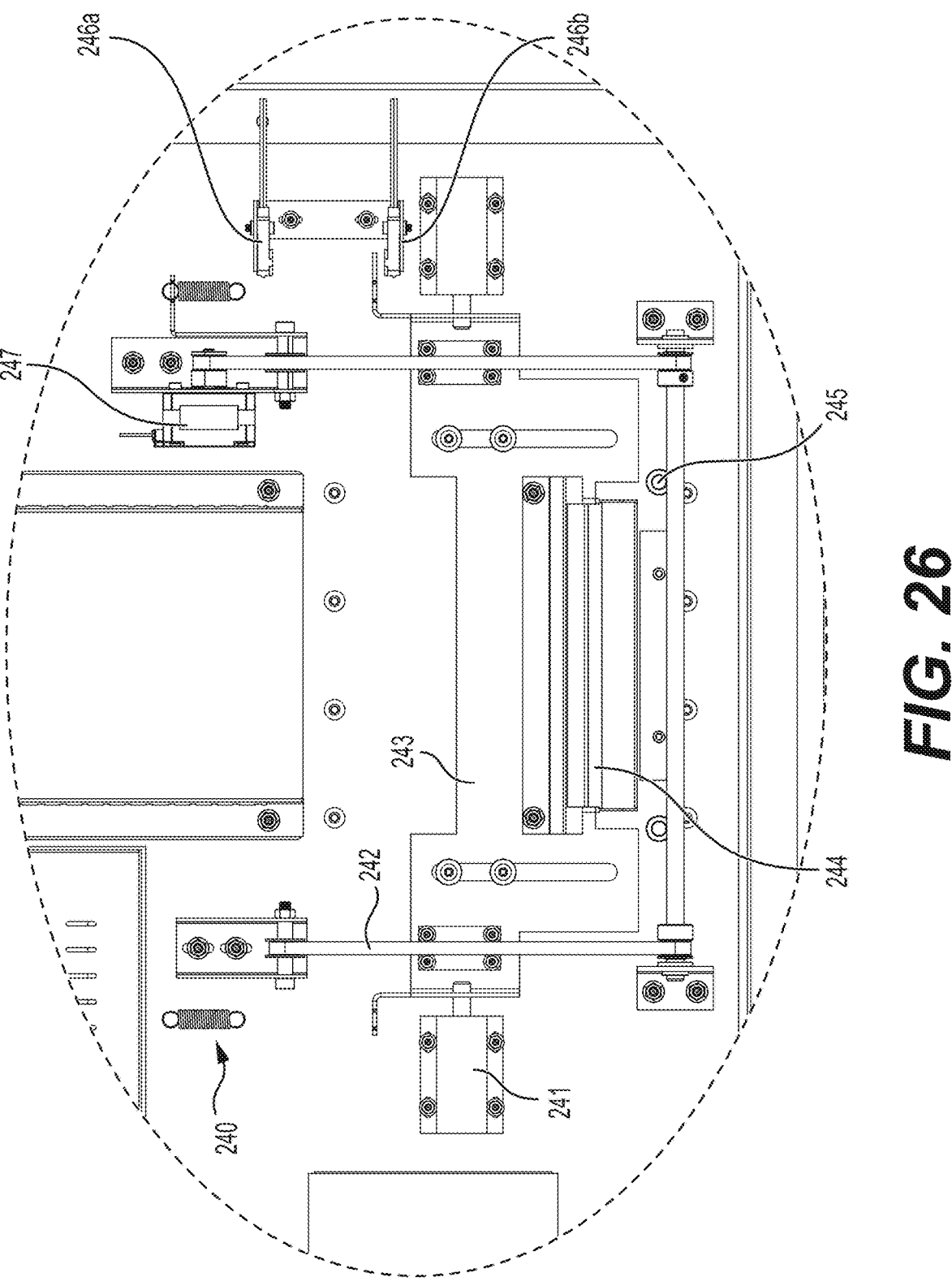
FIG. 26 is an inset view of portion "Q" of the hard drive destruction device of FIG. 25.
Figure 27:
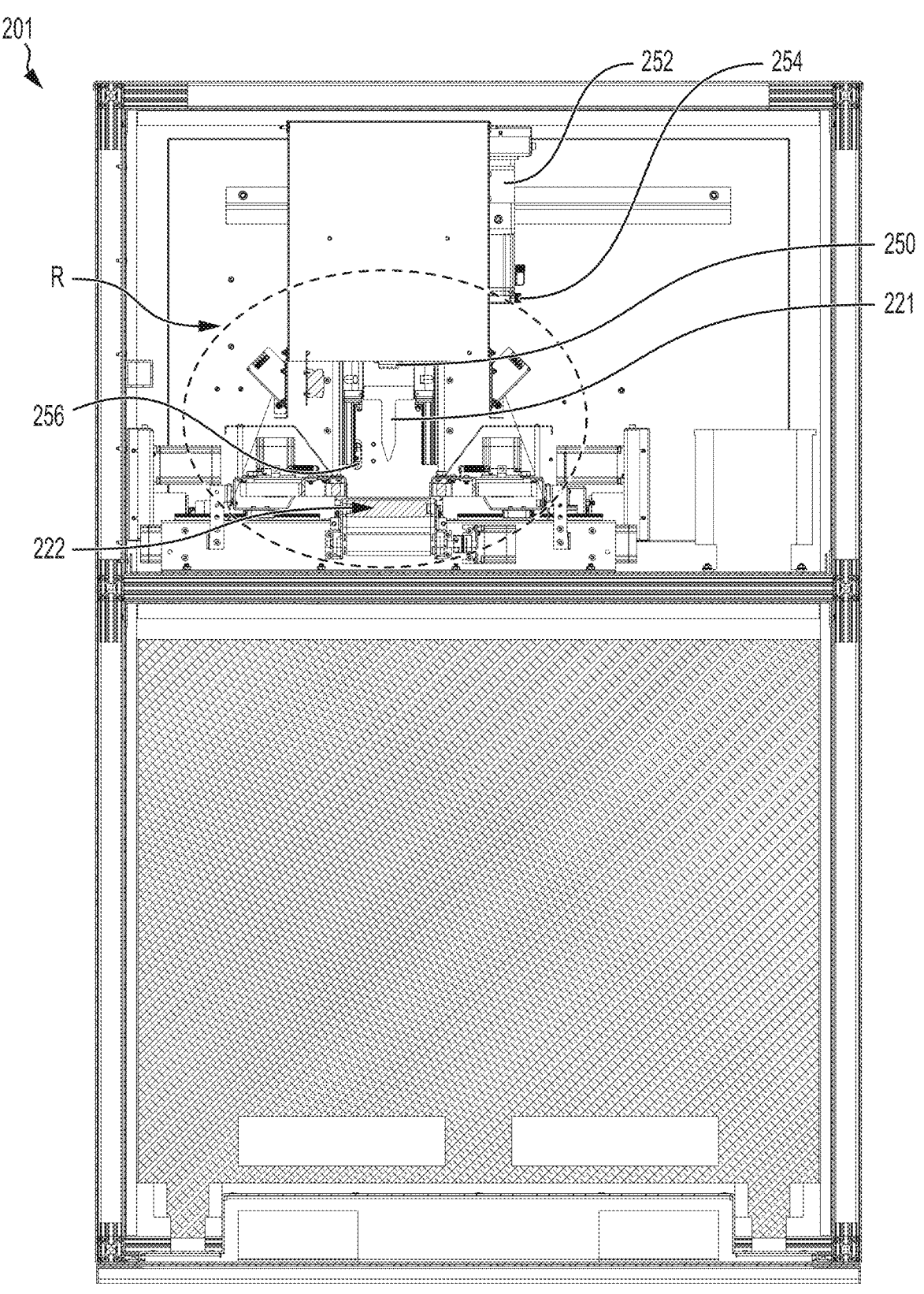
FIG. 27 is a cross-sectional view of the hard drive destruction device of FIG. 20, taken along line N-N of FIG. 22.

As shown in inset "Q" in FIG. 26, the kiosk 201 includes a door unit on the inside of the kiosk 201 body. The door unit allows the opening 210a of the inlet port 210 to be closed off. A door 243 and door seal 244 close off the opening 210a. The door 243 may be opened and closed by a belt 242 connected to a motor 247. A door top sensor 246a and a door bottom sensor 246b sense the top and bottom limits of the door opening and closing, respectively, and relay that information to stop the motor 247 running during operation of the door 243.

During operation of the hard drive destruction machine, once a hard drive is inserted into the kiosk 201, the door 243 closes and seals off the user from touching the hard drive.

When the kiosk 201 is in operation, the door 243 is only opened when the user is prompted to insert the hard drive, or when the user is ejecting the drive. Whenever the door is closed, the locking rams are activated, preventing any unauthorized access into the machine.

The door seal 244 may be a weather seal with a bulb-style seal. A break-beam sensor, which runs through a conduit 245 and into the inlet port 210 creates a curtain of light used to detect the presence of an object in the kiosk 201. The break-beam sensor may be light-emitting diodes (LEDs) arranged above and below or to the sides of the opening 210a, and detects if objects are blocking the door 243 from closing. Accordingly, the door 243 prevents incidental harm to foreign objects when the door is closing.

The kiosk 201 includes a crushing ram unit 220, as described above. The hard drive is pushed onto a crushing platform of the crush chamber of the crushing ram unit 220 by the drive receiver 222 when the crushing sequence is triggered. The crushing platform of the crush chamber includes a first crusher floor 227a and a second crusher floor 227b. The hard drive is centered within the crush chamber based on dimension information about the hard drive obtained by the first drive clamp sensor 232a, the second drive clamp sensor 232b and the camera 226.

A gap is set between the first crusher floor 227a and the second crusher floor 227b, which varies based on the dimensions of the hard drive. Accordingly, the hard drive may be properly centered in the crushing ram unit 220 so that the crushing ram head 221 intersects with critical components of the hard drive, and renders sensitive materials unusable by the crushing process. The crushing ram head 221 is used to crush the hard drive, such as by folding the hard drive in half or bending it at least 90 degrees, to effectively render the drive unusable. The gap between the first crusher floor 227a and the second crusher floor 227b aids in the crushing ram head 221 being able to properly crush the hard drive to at least 90 degrees.

Figure 28:
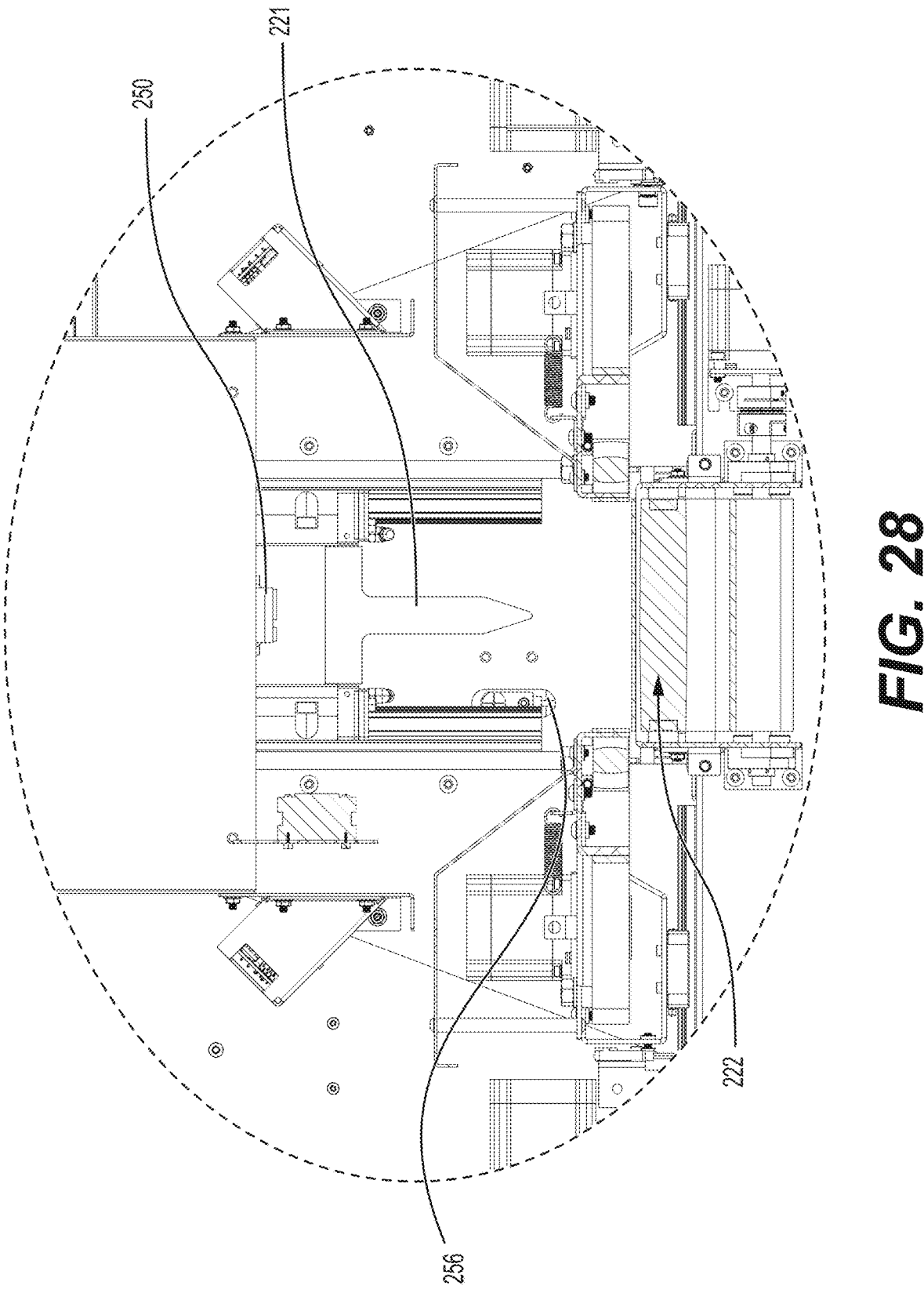
FIG. 28 is an inset view of portion "R" of the hard drive destruction device of FIG. 26.
Figure 29:
FIG. 29 is a cross-sectional view of the hard drive destruction device of FIG. 20, taken along line O-O of FIG. 22.

The crushing ram head 221 is positioned relative to the hard drive by a crushing ram motor 252, which is controlled by a crushing sensor, as shown in inset "R" in FIG. 28. The crushing sensor may be a combination of two sensors, an encoder 254 and a bottom sensor 256. The encoder 254 is attached to the crushing ram motor 252 that drives the crushing ram head 221, and is used to track the current location or position of the crushing ram head 221. The bottom sensor 256 is used as a failsafe for the encoder 254, and may be the absolute limit for the crushing ram head 221. It is positioned in a way that the hard drive may still be crushed properly if the encoder 254 ever fails. A transformer 229 provides 220-volt power to the crushing ram motor 252.

The encoder 254 may provide information to processing software to calculate the position of the crushing ram head 221 relative to the hard drive. A distance sensor 250 and a bottom sensor 256 may also provide information to processing software to calculate the position of the crushing ram head 221, such as the distance between the hard drive and the crushing ram head 221. Accordingly, the distance sensor 250, the encoder 254, and the bottom sensor 256 may determine how far the crushing ram head 221 should travel to crush the hard drive.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

I claim:

1. A hard drive destruction device comprising a kiosk including a hard drive portal for receiving a hard drive, a camera for capturing images of the hard drive, and a crushing unit, wherein the crushing unit comprises:
a crushing platform having a first crusher floor and a second crusher floor, wherein a gap between the first crusher floor and the second crusher floor is adjustable based on dimensions of the hard drive; and
a crushing ram head positioned to fold the hard drive at least 90 degrees during a crushing process,
wherein the crushing unit is configured to center the hard drive within the crushing unit such that the crushing ram head intersects critical components of the hard drive and renders the hard drive unusable by the crushing process.

2. The hard drive destruction device of claim 1, wherein the crushing unit further comprises a gap adjustment mechanism configured to vary the gap between the first crusher floor and the second crusher floor based on dimensional information of the hard drive.

3. The hard drive destruction device of claim 2, wherein the dimensional information of the hard drive is determined by at least one sensor selected from a drive clamp sensor, a camera, and a spring-actuated position sensor.

4. The hard drive destruction device of claim 3, wherein the gap adjustment mechanism is configured to reposition at least one of the first crusher floor and the second crusher floor prior to activation of the crushing ram head.

5. The hard drive destruction device of claim 1, wherein the crushing ram head is positioned relative to the hard drive based on data from a feedback control system comprising at least one of an encoder, a distance sensor, and a bottom sensor.

6. The hard drive destruction device of claim 5, wherein the encoder is configured to track a vertical travel distance of the crushing ram head and transmit position data to processing software for controlling the crushing operation.

7. The hard drive destruction device of claim 6, wherein the bottom sensor is a failsafe sensor for the encoder.

8. The hard drive destruction device of claim 5, wherein the distance sensor is configured to measure a distance between the crushing ram head and the hard drive and provide data for adjusting a crushing depth.

9. The hard drive destruction device of claim 1, further comprising a drive receiver configured to convey the hard drive from the hard drive portal to the crushing unit.

* * * * *